United States Patent
Shirai et al.

(10) Patent No.: US 11,469,012 B2
(45) Date of Patent: Oct. 11, 2022

(54) ELECTRIC WIRE TWISTING DEVICE AND ELECTRIC WIRE TWISTING METHOD

(71) Applicant: Shinmaywa Industries, Ltd., Takarazuka (JP)

(72) Inventors: Hiroaki Shirai, Takarazuka (JP); Junya Enomoto, Takarazuka (JP); Takayuki Mononobe, Takarazuka (JP); Naoki Fujisawa, Takarazuka (JP); Tatsuya Yamada, Takarazuka (JP)

(73) Assignee: SHINMAYWA INDUSTRIES, LTD., Hyogo (JP)

( * ) Notice: Subject to any disclaimer, the term of this patent is extended or adjusted under 35 U.S.C. 154(b) by 62 days.

(21) Appl. No.: 16/987,428

(22) Filed: Aug. 7, 2020

(65) Prior Publication Data

US 2020/0373040 A1    Nov. 26, 2020

Related U.S. Application Data

(62) Division of application No. 16/090,862, filed as application No. PCT/JP2017/009941 on Mar. 13, 2017, now Pat. No. 10,984,925.

(30) Foreign Application Priority Data

Mar. 14, 2016  (JP) ................ 2016-049580
Mar. 14, 2016  (JP) ................ 2016-049581
(Continued)

(51) Int. Cl.
*B21F 7/00*     (2006.01)
*H01B 13/02*    (2006.01)
(Continued)

(52) U.S. Cl.
CPC .......... *H01B 13/0271* (2013.01); *B21F 7/00* (2013.01); *B21F 15/04* (2013.01); *H01B 13/02* (2013.01); *H02G 1/1248* (2013.01); *H01R 43/28* (2013.01)

(58) Field of Classification Search
CPC .... H02G 1/1248; H02G 1/1256; B21F 15/04; B21F 15/14; B21F 7/00; B21F 15/02;
(Continued)

(56) References Cited

U.S. PATENT DOCUMENTS 730,516 A * 6/1903 Culver .................. B65H 54/56
                                                    57/26
4,132,250 A * 1/1979 Brown ............... H01B 13/0207
                                                    140/115
(Continued)

FOREIGN PATENT DOCUMENTS

JP    2007242431 A *  9/2007  ......... H01B 13/0207
WO   WO-2011105629 A1 * 9/2011 ............. D07B 7/022

OTHER PUBLICATIONS

Peter Kort, how to make a cord for ply-split braiding, Feb. 9, 2015, Youtube, https://www.youtube.com/watch?v=2NDTCkJ0PDc (Year: 2015).*

(Continued)

*Primary Examiner* — Debra M Sullivan
(74) *Attorney, Agent, or Firm* — Keating & Bennett, LLP

(57) ABSTRACT

An electric wire twisting device is provided, which is capable of producing a preferable twisted electric wire from a plurality of electric wires of which both ends are cut. An electric wire twisting device 1 includes a first gripping device 11 including a first clamp 2a that grips a first end of a first electric wire CT, a second clamp 2b that grips a first end of a second electric wire C2, and a first holder 15A that holds the first clamp 2a and the second clamp 2b. The electric wire twisting device 1 includes a second gripping (Continued)

device 12 that grips a second end of the first electric wire CT and a second end of the second electric wire CT, a first revolving actuator 3b that causes the first holder 15A to rotate around a center line of revolution CL, and a first rotating actuator 3a that causes the first clamp 2a and the second clamp 2b to rotate around a center line of rotation that is parallel to the center line of revolution CL or is inclined with respect to the center line of revolution CL.

16 Claims, 20 Drawing Sheets

(30) Foreign Application Priority Data

| | | |
|---|---|---|
| Mar. 14, 2016 | (JP) | 2016-049582 |
| Sep. 29, 2016 | (JP) | 2016-191444 |
| Jan. 23, 2017 | (JP) | 2017-009352 |

(51) Int. Cl.
    *B21F 15/04*    (2006.01)
    *H02G 1/12*     (2006.01)
    *H01R 43/28*    (2006.01)

(58) Field of Classification Search
CPC ............ H01B 13/0207; H01B 13/0214; H01B 13/0221; H01B 13/0228; H01B 13/02; D01H 1/003; D01H 1/006; D01H 7/86
USPC ............................ 72/371; 140/118, 119, 149
See application file for complete search history.

(56) References Cited

U.S. PATENT DOCUMENTS 5,946,897 A * 9/1999 Ichikawa ............ H01B 13/0207
                                            57/25
2009/0241314 A1* 10/2009 Watanabe .......... H01B 13/0271
                                           29/33 F

OTHER PUBLICATIONS

Joes, ply split braiding, koorden maken met elsbeth-Nynke, May 12, 2015, Youtube, https://www.youtube.com/watch?v=RCoTxy81q_U (Year: 2015).*

Shirai et al., "Electric Wire Twisting Device and Electric Wire Twisting Method", U.S. Appl. No. 16/090,862, filed Oct. 3, 2018.

* cited by examiner

ELECTRIC WIRE TWISTING DEVICE AND ELECTRIC WIRE TWISTING METHOD

TECHNICAL FIELD

The present invention relates to an electric wire twisting device and an electric wire twisting method for twisting a plurality of electric wires.

BACKGROUND ART

Conventionally, an electric wire twisting device and an electric wire twisting method for twisting a plurality of electric wires are known. For example, Patent Literature 1 discloses an electric wire twisting device for twisting a first electric wire wound around a first bobbin and a second electric wire wound around a second bobbin. In this electric wire twisting device, the first and second electric wires are twisted while pulling out the first electric wire from the first bobbin and pulling out the second electric wire from the second bobbin.

Patent Literature 2 discloses an electric wire twisting device including a first clamp that grips one end of a first electric wire, a second clamp that grips one end of a second electric wire, and a third clamp that grips the other set of ends of the first and second electric wires. In this electric wire twisting device, the first and second clamps are rotated collectively to twist the first and second electric wires in a state in which the third clamp is fixed. In this specification, rotating the first and second clamps collectively is referred to as "revolution". Rotating the first and second clamps independently is referred to as "rotation". In the electric wire twisting device disclosed in Patent Literature 2, the first and second clamps are rotated in a direction opposite to the direction of revolution during the revolution so that the respective electric wires themselves are not twisted during the twisting.

CITATION LIST

Patent Literature

Patent Literature 1: Japanese Patent Application Publication No. H02-44615
Patent Literature 2: Japanese Patent Application Publication No. 2009-129729

SUMMARY OF INVENTION

Technical Problem

In the electric wire twisting device of Patent Literature 1, both electric wires are twisted while being pulled out. In order to obtain a twisted electric wire having a desired length, cutting the twisted electric wire after twisting is necessary. However, cutting a pair of electric wires after twisting is complicated.

In the electric wire twisting device of Patent Literature 2, a twisted electric wire can be produced from a pair of electric wires of which both ends are cut in advance. However, in the electric wire twisting device of Patent Literature 2, rotating mechanisms that rotate the first and second clamps, respectively, and a revolving mechanism that rotates the first and second clamps collectively are driven by the same motor. Due to this, it is not possible to operate the rotating mechanisms and the revolving mechanism independently. Various kinds of wires having various diameters or hardness are to be twisted. With respect to an electric wire having a core and a covering, there are various kinds of electric wires which have same diameter but different covering thicknesses. In the electric wire twisting device disclosed in Patent Literature 2, it is impossible to control rotation and revolution independently in accordance with the specification of each types of various electric wires. Therefore, there is a case in which it is not possible to twist a plurality of electric wires appropriately so that the twisted electric wire has desired impedance characteristics.

In view of the above-described problems, an object of the present invention is to provide an electric wire twisting device and an electric wire twisting method capable of producing an appropriate twisted electric wire from a plurality of electric wires of which both ends are cut.

Solution to Problem

An electric wire twisting device according to the present invention is an electric wire twisting device producing a twisted electric wire by twisting at least a first electric wire and a second electric wire, each of the first and second electric wires having a first end and a second end. The electric wire twisting device includes a first gripping device including a first clamp that grips the first end of the first electric wire, a second clamp that grips the first end of the second electric wire, and a first holder that holds the first clamp and the second clamp. The electric wire twisting device includes a second gripping device that grips the second end of the first electric wire and the second end of the second electric wire; a first revolving actuator that is connected to the first holder and causes the first holder to rotate around a center line of revolution positioned between the first clamp and the second clamp; and a first rotating actuator that is connected to at least the first clamp and causes the first clamp to rotate around a first center line of rotation that is parallel to the center line of revolution or is inclined with respect to the center line of revolution.

An electric wire twisting method according to the present invention is an electric wire twisting method of twisting at least a first electric wire and a second electric wire, each of the first and second electric wires having a first end and a second end. The electric wire twisting method includes a gripping step of gripping the first end of the first electric wire and the first end of the second electric wire and gripping the second end of the first electric wire and the second end of the second electric wire; a revolving step of rotating the first ends of the first and second electric wires collectively and/or the second ends of the first and second electric wires collectively; and a rotating step of rotating the first ends of the first and second electric wires independently and/or rotating the second ends of the first and second electric wires independently. The rotating step starts after the revolving step starts.

Advantageous Effects of Invention

According to the present invention, it is possible to produce an appropriate twisted electric wire from a plurality of electric wires of which both ends are cut.

DESCRIPTION OF EMBODIMENTS

First Embodiment

Figure 1:
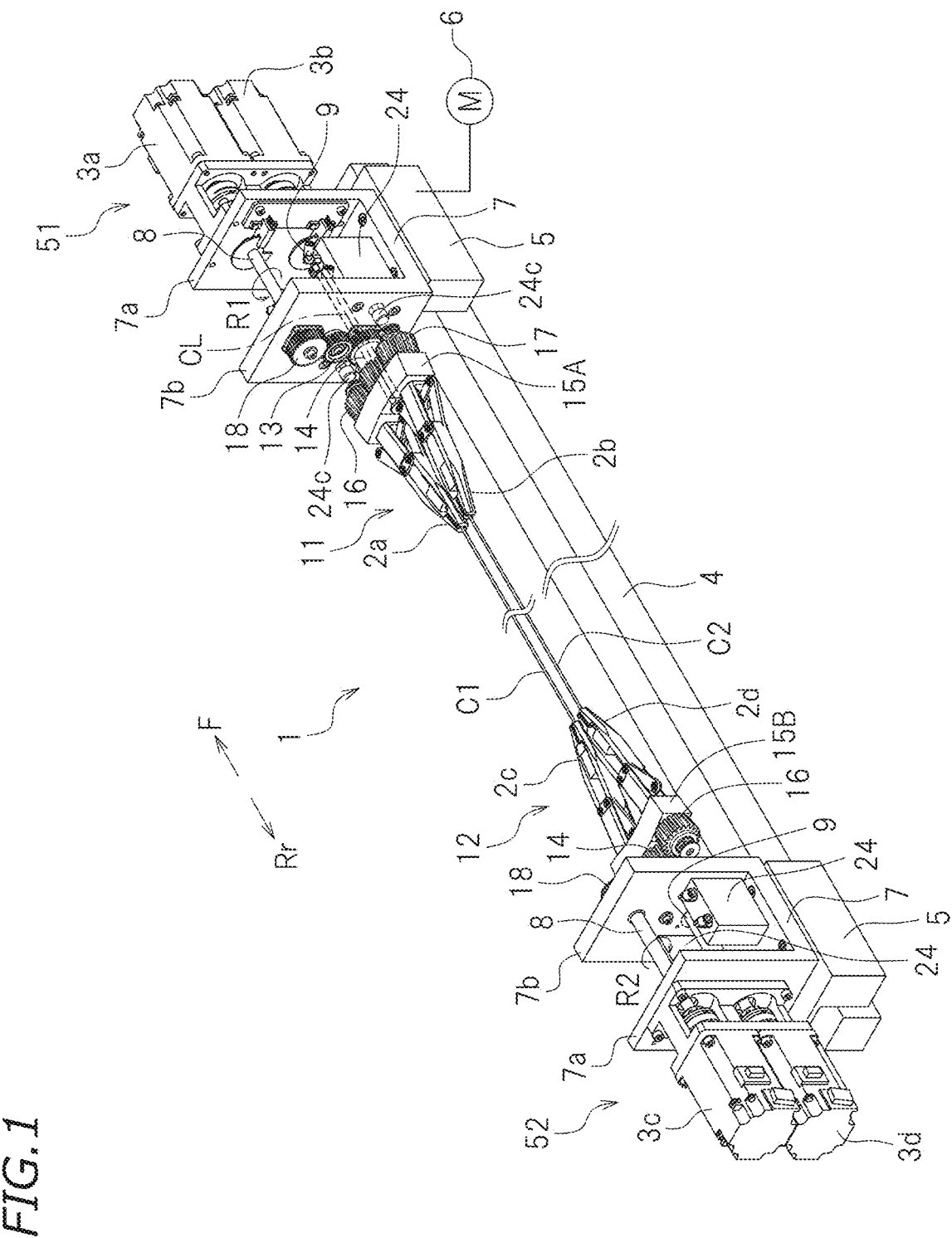
FIG. 1 is a perspective view of an electric wire twisting device according to a first embodiment.
Figure 2:
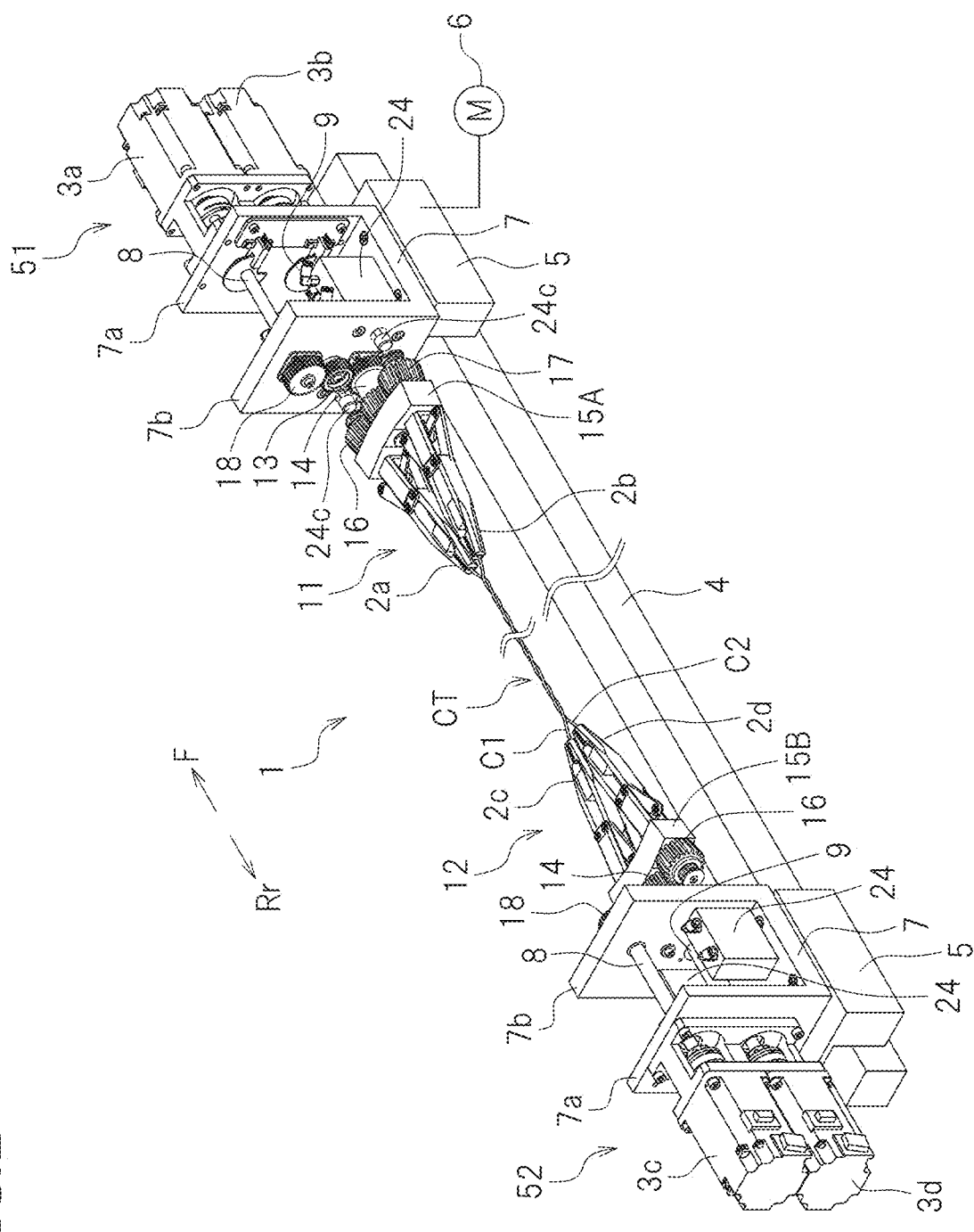
FIG. 2 is a perspective view of the electric wire twisting device after electric wires are twisted.
Figure 3:
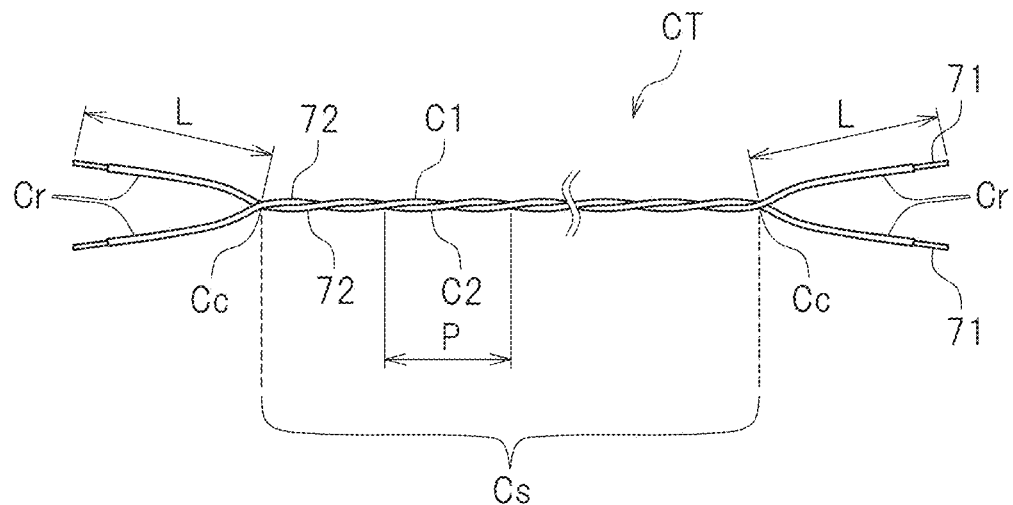
FIG. 3 is a side view of a twisted electric wire.

Hereinafter, an embodiment of the present invention will be described with reference to the drawings. As illustrated in FIGS. 1 and 2, an electric wire twisting device (hereinafter referred to simply as a twisting device) 1 according to an embodiment of the present invention is a device that twists two electric wires C1 and C2 (hereinafter, the electric wires C1 and C2 will be referred to as a first electric wire and a second electric wire, respectively). As illustrated in FIG. 3, each of the electric wires C1 and C2 has a core 71 and a covering 72 that covers the core 71. The core 71 is formed of a conductor such as metal or the like and the covering 72 is formed of an insulator such as a vinyl resin or the like. The edges of both electric wires C1 and C2 may be processed. For example, as illustrated in FIG. 3, the coverings 72 at the ends of both electric wires C1 and C2 may be stripped. Moreover, terminals (not illustrated) may be pressure-joined to the ends of both electric wires C1 and C2.

As illustrated in FIG. 1, the twisting device 1 includes a rail 4 and a first gripping unit 51 and a second gripping unit 52 supported by the rail 4. At least one of the first and second gripping units 51 and 52 is slidably supported by the rail 4. In the present embodiment, the first gripping unit 51 is slidably supported by the rail 4. However, the second gripping unit 52 may be slidably supported by the rail 4. Both the first and second gripping units 51 and 52 may be slidably supported by the rail 4.

In the following description, symbols F and Rr in the drawings indicate the front and rear, respectively. However, these directions are determined for the sake of convenience only and do not restrict an actual installation of the twisting device 1. The rail 4 extends in a front-rear direction. The first gripping unit 51 is located forward of the second gripping unit 52.

The first and second electric wires C1 and C2 each have a front end and a rear end. Here, the front end and the rear end are examples of a "first end" and a "second end", respectively. The first gripping unit 51 includes a first gripping device 11 that grips the front end of the first electric wire C1 and the front end of the second electric wire C2. The first gripping device 11 includes a first clamp 2a that grips the front end of the first electric wire C1, a second clamp 2b that grips the front end of the second electric wire C2, and a first holder 15A that holds the first and second clamps 2a and 2b. The second gripping unit 52 includes a second gripping device 12 that grips the rear end of the first electric wire C1 and the rear end of the second electric wire C2. The second gripping device 12 includes a third clamp 2c that grips the rear end of the first electric wire C1, a fourth clamp 2d that grips the rear end of the second electric wire C2, and a second holder 15B that holds the third and fourth clamps 2c and 2d.

First, a configuration of the first gripping unit 51 will be described. The first gripping unit 51 includes a base 5 that engages with the rail 4 and a unit body 7 that is supported by the base 5. The unit body 7 has a vertical plate 7a and a vertical plate 7b. The vertical plate 7a is located in front of the vertical plate 7b. A first motor 3a and a second motor 3b are fixed to a front portion of the vertical plate 7a. The first and second motors 3a and 3b are examples of a "first rotating actuator" and a "first revolving actuator", respectively. A rotating shaft 8 connected to the first motor 3a passes through the vertical plates 7a and 7b. A gear 18 is fixed to a rear end of the rotating shaft 8. The gear 18 is located rearward of the vertical plate 7b. A gear 13 is located below the gear 18, and a driving gear 14 is located below the gear 13. The gear 13 engages with the gear 18, and a front portion of the driving gear 14 engages with the gear 13. A first gear 16 and a second gear 17 are located on lateral sides of the rear portion of the driving gear 14. The driving gear 14 is located between the first and second gears 16 and 17. The rear portion of the driving gear 14 is configured as a tapered gear. The rear portion of the driving gear 14 engages with the first and second gears 16 and 17.

Figure 4:
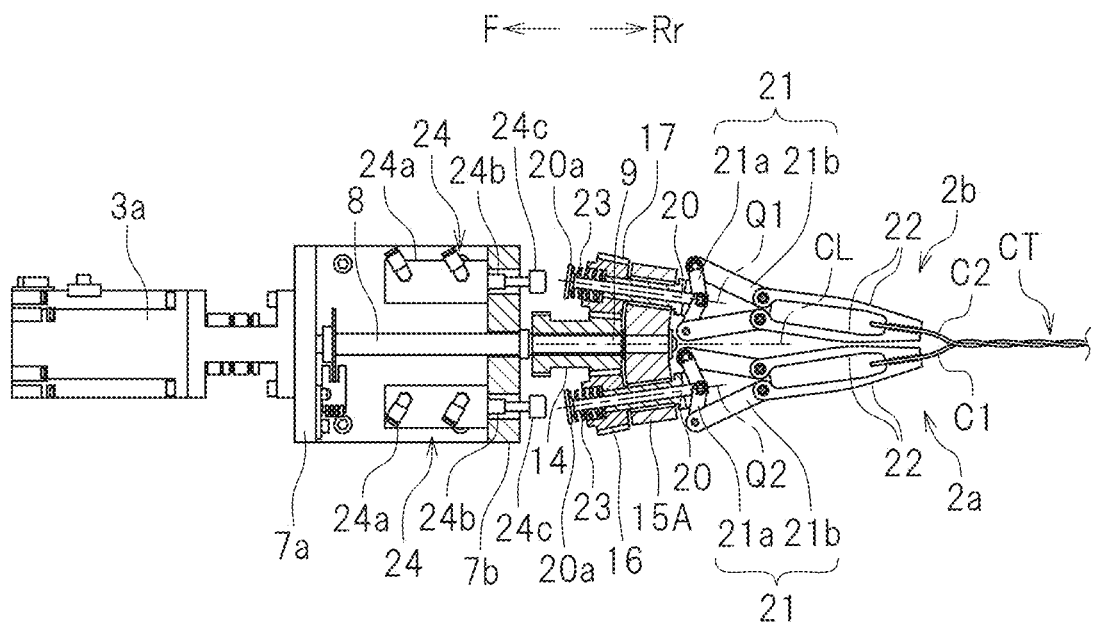
FIG. 4 is a partially sectioned plan view of a first gripping device.

FIG. 4 is a plan view of the first gripping unit 51 illustrating a portion of the first gripping unit 51 in a sectioned state. As illustrated in FIG. 4, the first and second gears 16 and 17 are configured as a tapered gear. The first and second clamps 2a and 2b each have a shaft 20, a compression spring 23, a pair of grip arms 22, and a link 21 that connects the shaft and the grip arm 22. The link 21 has a first link bar 21a and a second link bar 21b rotatably connected to the first link bar 21a. The shaft 20 of the first clamp 2a passes through the first gear 16 and the first holder 15A. The shaft 20 of the first clamp 2a is supported by the first gear 16 and the first holder 15A so as to be movable in an axial direction of the shaft 20. The shaft 20 of the first clamp 2a is supported by the first gear 16 so as not to be rotatable to the first gear 16 and rotatably supported by the first holder 15A. The shaft 20 of the second clamp 2b passes through the second gear 17 and the first holder 15A. The shaft 20 of the second clamp 2b is supported by the second gear 17 and the first holder 15A so as to be movable in the axial direction of the shaft 20. The shaft 20 of the second clamp 2b is supported by the second gear 17 so as not to be rotatable to the second gear 17 and rotatably supported by the first holder 15A. In the present embodiment, a center line Q1 of the shaft 20 of the first clamp 2a is a "first center line of rotation", and a center line Q2 of the shaft 20 of the second clamp 2b is a "second center line of rotation".

A pressure receiving portion 20a having a larger outer diameter than the shaft 20 is provided in a base end of the shaft 20 of each of the first and second clamps 2a and 2b. The distal end of the shaft 20 of each of the first and second clamps 2a and 2b is connected to the first link bar 21a of the link 21. The grip arm 22 is connected to the distal end of the shaft 20 via the link 21. The shaft 20 and the grip arm 22 are connected so that the grip arm 22 is open when the shaft 20 moves from the base end toward the distal end and the grip arm 22 is closed when the shaft 20 moves from the distal end toward the base end. The compression spring 23 of the first clamp 2a is disposed between the first gear 16 and the pressure receiving portion 20a of the shaft 20. The compression spring 23 of the second clamp 2b is disposed between the second gear 17 and the pressure receiving portion 20a of the shaft 20. The shaft 20 is pulled toward the base end by the compression spring 23. The compression spring 23 provides the grip arm 22 with a force to close.

Figure 5:
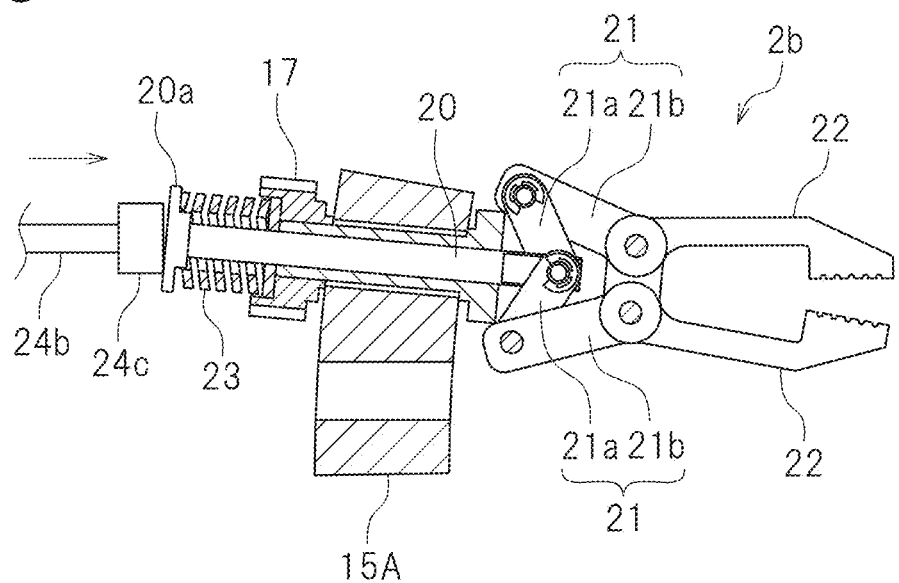
FIG. 5 is a partially enlarged cross-sectional view of the first gripping device when a grip arm is open.

A clamp actuator 24 is located between the vertical plates 7a and 7b. The clamp actuator 24 is configured to generate force that presses the shaft 20 from the base end toward the distal end. In the present embodiment, the clamp actuator 24 is configured as an air cylinder. However, the clamp actuator 24 is not limited to an air cylinder but may be other actuators such as a motor. The clamp actuator 24 includes a cylinder 24a, a rod 24b, and a pressing portion 24c provided at a distal end of the rod 24b. When the clamp actuator 24 is turned on, the rod 24b is extended, and the pressing portion 24c presses the pressure receiving portion 20a of the shaft 20 as illustrated in FIG. 5. In this way, the grip arm 22 is open. On the other hand, when the clamp actuator 24 is turned off, the rod 24b is contracted, and the pressing portion 24c is separated from the pressure receiving portion 20a of the shaft 20. As a result, the shaft 20 is pulled toward the base end by the force of the compression spring 23 and the grip arm 22 is closed (see FIG. 4).

As illustrated in FIG. 1, the rotating shaft 9 connected to the second motor 3b passes through the vertical plates 7a and 7b. The rotating shaft 9 passes through the driving gear 14 and is fixed to the first holder 15A (see FIG. 4). The rotating shaft 9 is rotatable with respect to the driving gear 14. The first holder 15A rotates together with the rotating shaft 9. In the present embodiment, the center line CL of the rotating shaft 9 is a "center line of revolution".

In the present embodiment, as illustrated in FIG. 4, the first and second center lines of rotation Q1 and Q2 are tilted from the center line of revolution CL. The shaft 20 of each of the first and second clamps 2a and 2b is inclined with respect to the center line of revolution CL such that a portion of the shaft 20 comes close to the center line of revolution CL as the portion of the shaft 20 comes close to the distal end. The first and second clamps 2a and 2b are disposed such that a portion of them come close to the center line of revolution CL as the portion of them come close to the distal end. The grip arm 22 of each of the first and second clamps 2a and 2b is disposed such that a portion of the grip arm 22 come close to the center line of revolution CL as the portion of the grip arm 22 come close to the distal end.

For example, by driving the first motor 3a and stopping the second motor 3b, it is possible to rotate the first and second clamps 2a and 2b. That is, it is possible to cause the first and second clamps 2a and 2b to rotate. Here, the rotation of the first clamp 2a around the first center line of rotation Q1 and the rotation of the second clamp 2b around the second center line of rotation Q2 will be referred to as "rotation". Specifically, when the first motor 3a is driven, the rotating shaft 8 rotates. When the rotating shaft 8 rotates, the gear 18 rotates. When the gear 18 rotates, the gear 13 rotates. When the gear 13 rotates, the driving gear 14 rotates. In this way, the driving gear 14 is connected to the first motor 3a via the gears 13 and 18 and the rotating shaft 8. The driving gear 14 rotates by receiving the driving force of the first motor 3a. Since the first and second gears 16 and 17 are engaged with the driving gear 14, when the gear 18 rotates, the first and second gears 16 and 17 rotate. Therefore, the shafts 20 of the first and second clamps 2a and 2b rotate, whereby the grip arms 22 of the first and second clamps 2a and 2b rotate. In the present embodiment, the first motor 3a, the rotating shaft 8, and the gears 13 to 18 form a "rotation driving mechanism" that rotates the first and second clamps 2a and 2b.

When the second motor 3b is driven, the first holder 15A rotates and the first gripping device 11 rotates. When the first gripping device 11 rotates, the first and second clamps 2a and 2b rotate collectively. Therefore, driving the second motor 3b makes it possible to cause the first and second clamps 2a and 2b to revolve. Here, rotation of the first and second clamps 2a and 2b around the center line of revolution CL will be referred to as "revolution". Specifically, when the second motor 3b is driven, the rotating shaft 9 rotates. Since the rotating shaft 9 is fixed to the first holder 15A, when the rotating shaft 9 rotates, the first holder 15A rotates. Since the first and second clamps 2a and 2b are held by the first holder 15A, the first and second clamps 2a and 2b rotate collectively according to rotation of the first holder 15A. In the present embodiment, the second motor 3b and the rotating shaft 9 form a "revolution driving mechanism" that rotates the first gripping device 11.

The first gripping unit 51 includes a moving device 6 having a motor or the like that moves the base 5 along the rail 4. The configuration of the moving device 6 is not particularly limited and various known devices can be used. For example, although not illustrated in the drawings, the moving device 6 may include a power transmission belt connected to the base 5, a pulley wound around the power transmission belt, and a motor connected to the pulley. A driving source is not limited to a motor. An air cylinder, a spring, and the like can be used as the driving source.

Hereinabove, the configuration of the first gripping unit 51 has been described. The second gripping unit 52 has the same configuration as the first gripping unit 51 except that the base 5 is fixed to the rail 4 so as to be immovable. The second gripping unit 52 and the first gripping unit 51 have a symmetric configuration in relation to the front-rear direction. The second gripping unit 52 includes a third clamp 2c, a fourth clamp 2d, a second holder 15B, a third motor 3c, and a fourth motor 3d instead of the first clamp 2a, the second clamp 2b, the first holder 15A, the first motor 3a, and the second motor 3b, respectively. The first clamp 2a, the second clamp 2b, the first holder 15A, the first motor 3a, and the second motor 3b have the same configuration as the third clamp 2c, the fourth clamp 2d, the second holder 15B, the third motor 3c, and the fourth motor 3d, respectively. Since the other components are similar to those of the first gripping unit 51, and the same components will be denoted by the same reference numerals, and the description thereof will be omitted.

The twisting device 1 includes a controller 30 that controls the revolution driving mechanism and the rotation driving mechanism. The controller is communicably connected to the first to fourth motors 3a, 3b, 3c, and 3d, the clamp actuators 24 of the first and second gripping units 51 and 52, and the moving device 6 so as to control these components. The configuration of the controller 30 is not particularly limited and is configured as a microcomputer, for example. The controller 30 may include a CPU, a RAM, a ROM, and the like, for example. The controller 30 may be a controller dedicated for the twisting device 1 and may be a general-purpose controller such as a personal computer.

Figure 6:
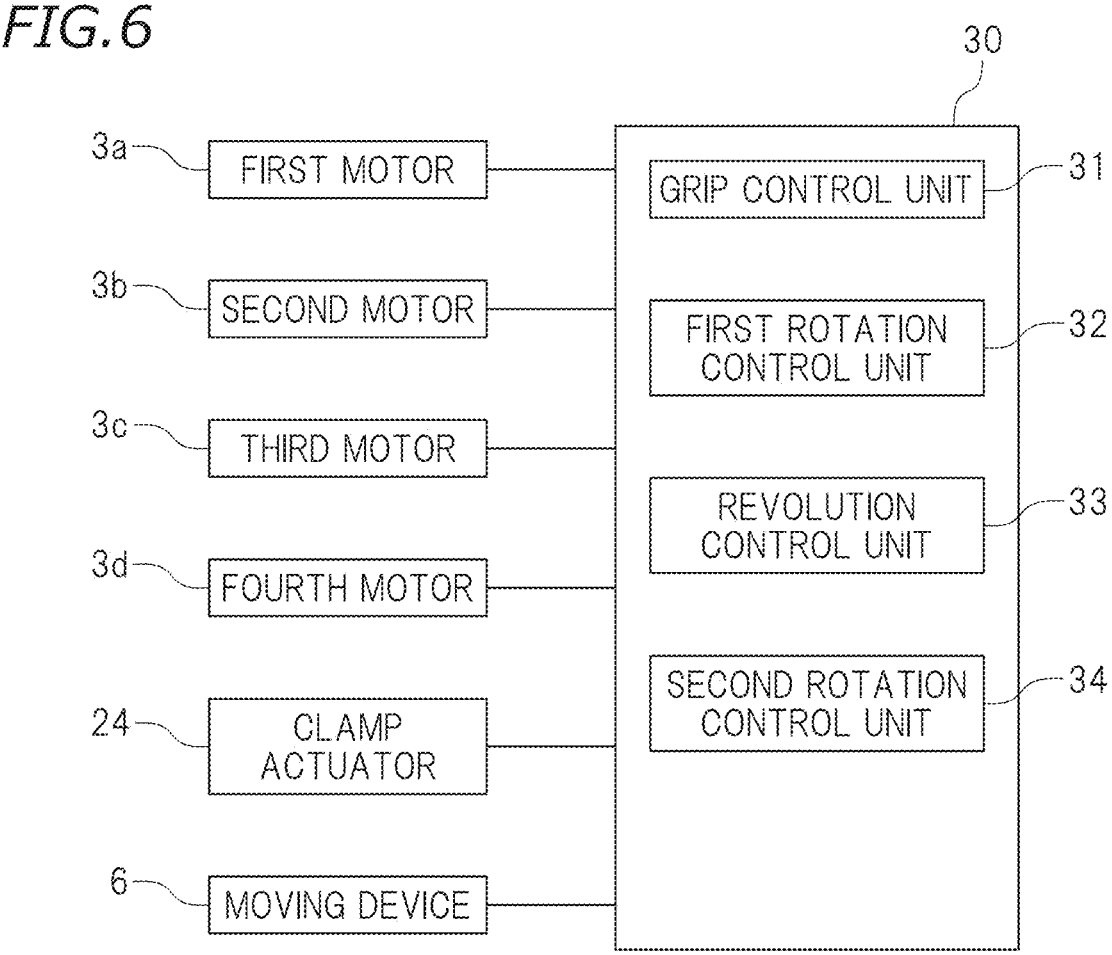
FIG. 6 is a block diagram of a controller or the like of the electric wire twisting device.

As illustrated in FIG. 6, the controller 30 includes a grip control unit 31, a first rotation control unit 32, a revolution control unit 33, and a second rotation control unit 34. These respective control units 31 to 34 are realized by a computer executing a predetermined program. These respective control units 31 to 34 are configured as identical or different processors.

Figure 7:
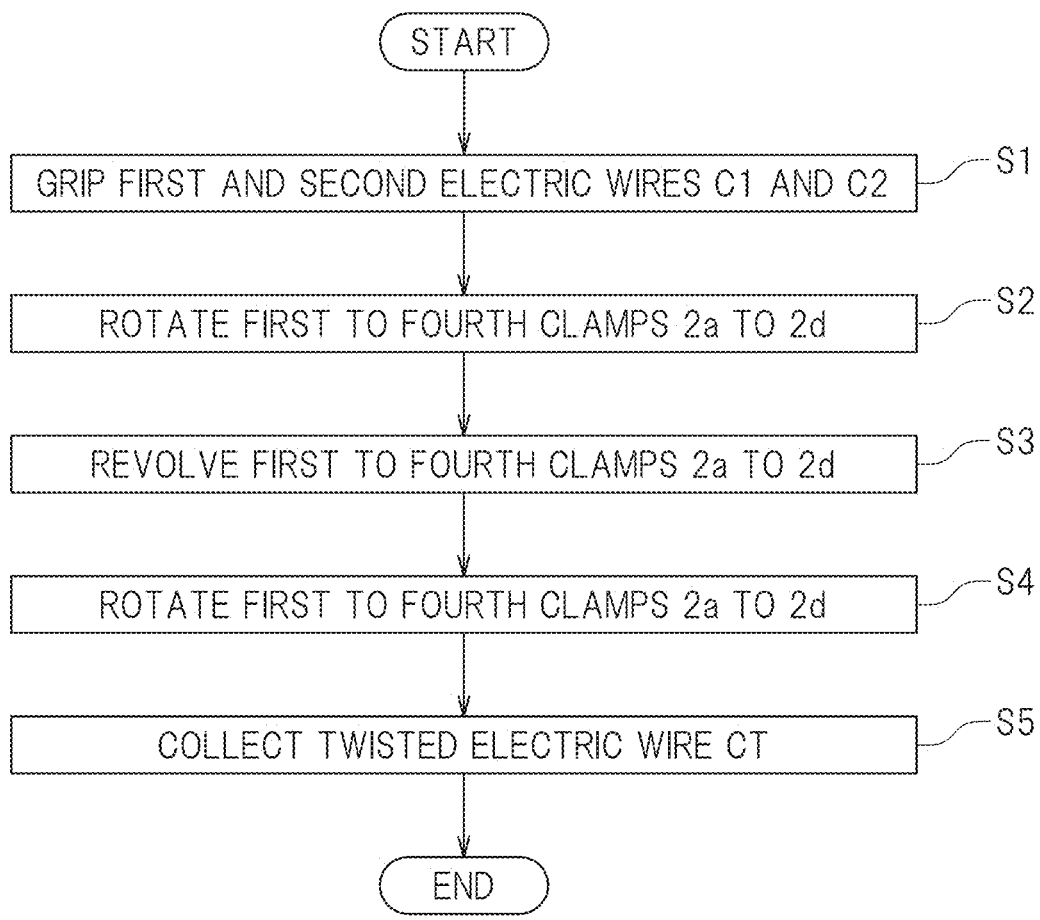
FIG. 7 is a flowchart of an electric wire twisting method.

Next, an example of an operation of the twisting device 1 will be described with reference to the flowchart of FIG. 7. First, a gripping step S1 is performed. In the gripping step S1, the grip control unit 31 drives the clamp actuators 24 of the first and second gripping units 51 and 52. In this way, the first and second gripping units 51 and 52 grip the first and second electric wires C1 and C2, respectively. Specifically, the first clamp 2a is open and closed so that the first clamp 2a grips the front end of the first electric wire C1. The second clamp 2b is open and closed so that the second clamp 2b grips the front end of the second electric wire C2. The third clamp 2c is open and closed so that the third clamp 2c grips the rear end of the first electric wire C1. The fourth clamp 2d is open and closed so that the fourth clamp 2d grips the rear end of the second electric wire C2. In this way, the first and second electric wires C1 and C2 are arranged in parallel (see FIG. 1).

Subsequently, a rotating step S2 is performed. In the rotating step S2, the first and third motors 3a and 3c are driven by the first rotation control unit 32. By doing so, the rotating shaft 8 of the first motor 3a rotates in the direction R1 in FIG. 1. The rotating shaft 8 of the third motor 3c rotates in the direction R2 opposite to the direction R1. The first and second clamps 2a and 2b rotate in the direction R2, and the third and fourth clamps 2c and 2d rotate in the direction R1. In this way, the front end and the rear end of the first electric wire C1 rotate in the opposite directions and the front end and the rear end of the second electric wires C2 rotate in the opposite directions. As a result, the first and second electric wires C1 and C2 are twisted independently.

Subsequently, a revolving step S3 is performed. In the revolving step S3, the revolution control unit 33 drives the second and fourth motors 3b and 3d. By doing so, the rotating shaft 9 of the second motor 3b rotates in the direction R1, and the rotating shaft 9 of the fourth motor 3d rotates in the direction R2. In this way, the first and second clamps 2a and 2b rotate collectively in the direction R1, and the third and fourth clamps 2c and 2d rotate collectively in the direction R2. The first to fourth clamps 2a to 2d revolve in a direction opposite to the direction of rotation. In this way, the first and second electric wires C1 and C2 are twisted (see FIG. 2). When the first and second electric wires C1 and C2 are twisted, an apparent length (that is, the length in the front-rear direction) of the electric wires C1 and C2 decreases. Therefore, the controller 30 drives the moving device 6 to move the base 5 of the first gripping unit 51 so that the distance between the first and second gripping units 51 and 52 decreases as the twisting of the electric wires C1 and C2 progresses. When the first and second electric wires C1 and C2 are loosened in advance before the revolving step S3 is performed, it is not necessary to decrease the distance between the first and second gripping units 51 and 52 in the course of the revolving step S3. In such a case, the moving device 6 is not necessary. The moving device 6 is not essential but can be omitted.

Figure 8:
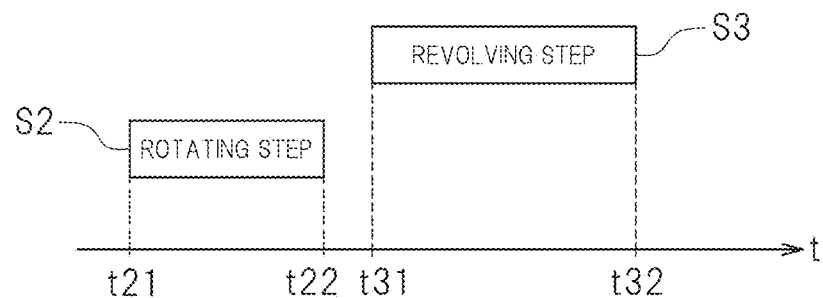
FIG. 8 is a timing chart of a rotating step S2 and a revolving step S3.
Figure 9:
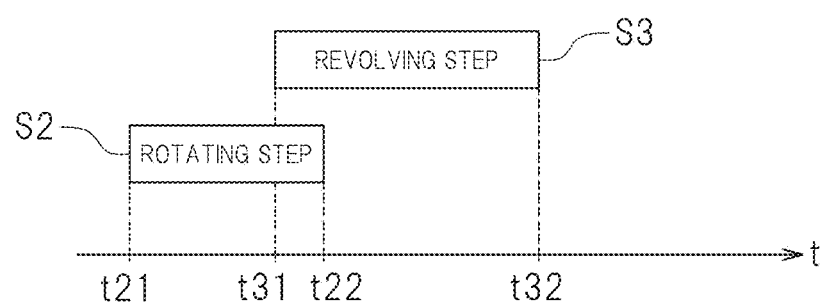
FIG. 9 is a timing chart of a rotating step S2 and a revolving step S3 according to a modification.
Figure 10:
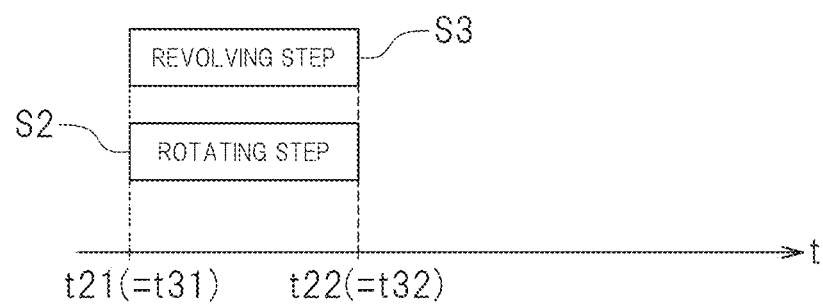
FIG. 10 is a timing chart of a rotating step S2 and a revolving step S3 according to a modification.

As illustrated in FIG. 8, the revolving step S3 may start after the rotating step S2 ends. t21 and t22 indicate the starting and ending time of the rotating step S2, respectively. t31 and t32 indicate the starting and ending time of the revolving step S3, respectively. A horizontal axis t indicates time. As illustrated in FIG. 8, t31 may be later than t22. The revolving step S3 may start simultaneously with the end of the rotating step S2. That is, t22=t31. As illustrated in FIG. 9, the revolving step S3 may start after the rotating step S2 starts and before the rotating step S2 ends. That is, t21<t31<t22. As illustrated in FIG. 10, the rotating step S2 and the revolving step S3 may be performed simultaneously. The rotating step S2 and the revolving step S3 may start simultaneously. That is, t21=t31. The rotating step S2 and the revolving step S3 may end simultaneously. That is, t22=t32. In this manner, the revolving step S3 may start simultaneously with or after the start of the rotating step S2, and the timings of the rotating step S2 and the revolving step S3 are not particularly limited.

In the twisting device 1, rotation is performed by the first and third motors 3a and 3c and revolution is performed by the second and fourth motors 3b and 3d. Rotation and revolution are performed by different motors. Due to this, the timings of rotation and revolution can be set independently. The number of rotations and the number of revolutions can be set independently. For example, the number of rotations may be set to be smaller or larger than, or the same as the number of revolutions. The rotation speed of rotation and the rotation speed of revolution can be set independently. The timings of rotation and revolution, the number of rotations and revolutions, and the rotation speed of rotation and revolution may be changed according to the kind of the first and second electric wires C1 and C2. For example, the covering 72 (see FIG. 3) may have a different thickness depending on the kind of the first and second electric wires C1 and C2. Depending on the kind of the first and second electric wires C1 and C2, untwisting may occur due to elastic force after twisting. In such a case, control may be performed so that the number of rotations in the rotating step S2 is increased, for example.

The first and second clamps 2a and 2b are separated in a direction perpendicular to the longitudinal direction of the twisted electric wire CT. Similarly, the third and fourth clamps 2c and 2d are separated in a direction perpendicular to the longitudinal direction of the twisted electric wire CT. In the state illustrated in FIG. 2, the first and second clamps 2a and 2b are separated in a left-right direction, and the third and fourth clamps 2c and 2d are separated in the left-right direction. Therefore, it is not possible to twist the distal ends of the first and second electric wires C1 and C2. As illustrated in FIG. 3, the twisted electric wire CT has a portion (hereinafter referred to as a twisted portion) Cs in which the first and second electric wires C1 and C2 are twisted and a portion (hereinafter referred to as a non-twisted portion) Cr in which the first and second electric wires C1 and C2 are not twisted. Here, a portion in which the first and second electric wires C1 and C2 are in contact is the twisted portion Cs, and a portion in which the first and second electric wires C1 and C2 are not in contact is the non-twisted portion Cr.

As a result of intensive studies, the present inventors have found that the position of a terminal end Cc of the twisted portion Cs does not change substantially even when the first and second clamps 2a and 2b are revolved further after the first and second clamps 2a and 2b are revolved so that the first and second electric wires C1 and C2 are twisted for a certain number of times. In this case, it has been found that the pitch (hereinafter also referred to as a twist pitch) P of twisting of the twisted portion Cs decreases and the length (hereinafter referred to as a residual twisting length) L of the non-twisted portion Cr does not decrease substantially. Furthermore, it has been found that although the number of twisting does not change when the first and second clamps 2a and 2b are rotated after the first and second electric wires C1 and C2 are twisted for a certain number of times, the length of the twisted portion Cs changes and the residual twisting length L changes. Specifically, it has been found that the residual twisting length L increases when the first and second clamps 2a and 2b are rotated in the same direction as the revolution direction, and the residual twisting length L decreases when the first and second clamps 2a and 2b are rotated in a direction opposite to the revolution direction.

Figure 11:
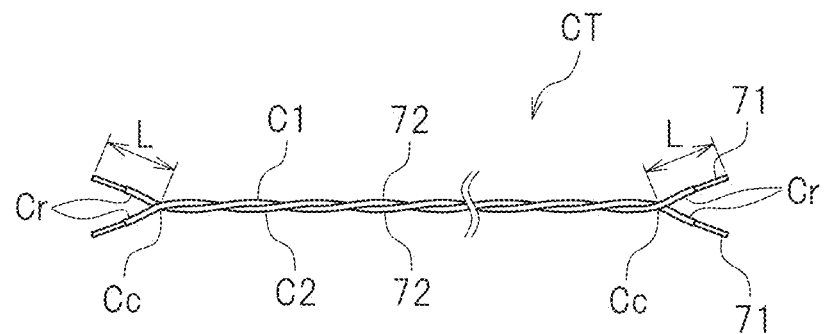
FIG. 11 is a side view of a twisted electric wire after a rotating step S4 is performed.

In this twisting device 1, based on the above-mentioned findings, the rotating step S4 is performed after the revolving step S3 is performed in order to decrease the residual twisting length L of the twisted electric wire CT. That is, the rotating step S4 is performed such that the first and second clamps 2a and 2b are rotated in a direction opposite to the revolution direction and the third and fourth clamps 2c and 2d are rotated in a direction opposite to the revolution direction. Specifically, after the revolution control unit 33 stops the second and fourth motors 3b and 3d, the second rotation control unit 34 drives the first and third motors 3a and 3c. The second rotation control unit 34 drives the first motor 3a so that the rotating shaft 8 of the first motor 3a rotates in the direction R1 and drives the third motor 3c so that the rotating shaft 8 of the third motor 3c rotates in the direction R2. In this way, as illustrated in FIG. 11, the terminal ends Cc of the first and second electric wires C1 and C2 move toward the distal end and the residual twisting length L of the twisted electric wire CT decreases.

Figure 12:
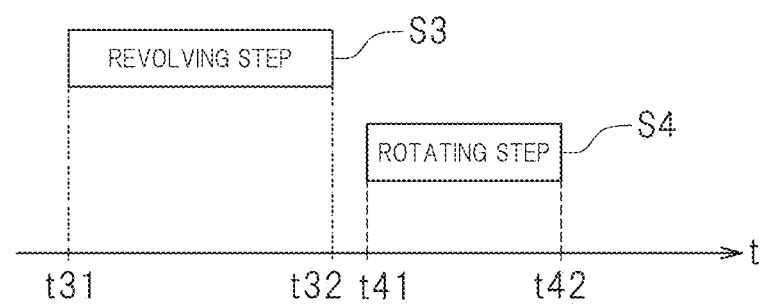
FIG. 12 is a timing chart of a revolving step S3 and a rotating step S4.

In the present embodiment, as illustrated in FIG. 12, the rotating step S4 starts after the revolving step S3 ends. t41 and t42 indicate the starting and ending time of the rotating step S4. Here, t32<t41. However, the rotating step S4 may start simultaneously with the end of the revolving step S3. That is, t32=t41. In the present embodiment, the rotating step only is performed after the revolving step ends. Due to this, it is possible to execute the rotating step S4 more stably. That is, by causing the first to fourth clamps 2a to 2d to rotate after twisting the first and second electric wires C1 and C2 by causing the first to fourth clamps 2a to 2d to revolve, it is possible to perform an operation of adjusting the residual twisting length L of the twisted electric wire CT more stably.

Figure 13:
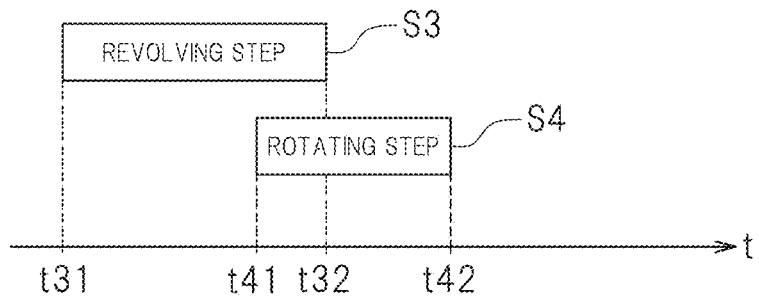
FIG. 13 is a timing chart of a revolving step S3 and a rotating step S4 according to a modification.
Figure 14:
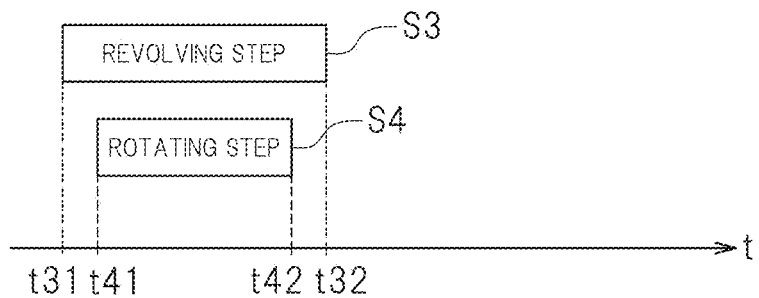
FIG. 14 is a timing chart of a revolving step S3 and a rotating step S4 according to a modification.
Figure 15:
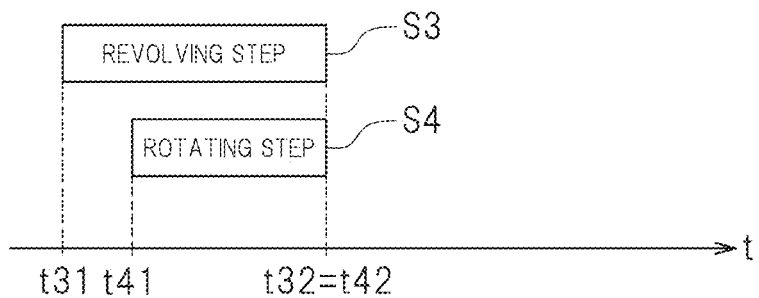
FIG. 15 is a timing chart of a revolving step S3 and a rotating step S4 according to a modification.
Figure 16:
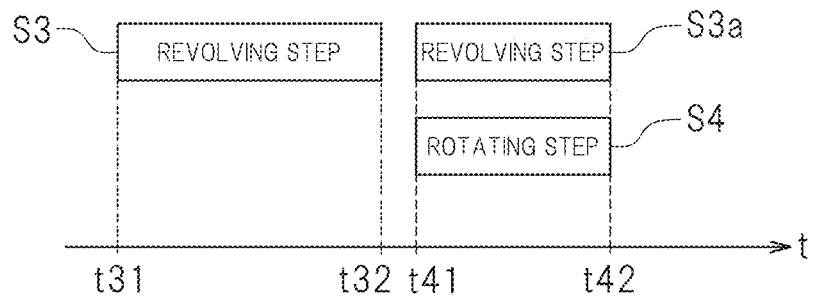
FIG. 16 is a timing chart of a revolving step S3 and a rotating step S4 according to a modification.

However, the timings of the revolving step S3 and the rotating step S4 are not limited to the above-described timings. The rotating step S4 may start after the revolving step S3 starts, and the starting time t41 of the rotating step S4 is not necessarily limited to the time after the end of the revolving step S3. As illustrated in FIGS. 13 to 15, the starting time t41 of the rotating step S4 may be earlier than the ending time t32 of the revolving step S3. In this case, the ending time t42 of the rotating step S4 may be later (see FIG. 13) or earlier (see FIG. 14) than or the same as (see FIG. 15) the ending time t32 of the revolving step S3. In the examples illustrated in FIGS. 13 to 15, the revolving step S3 and the rotating step S4 have an overlapping period. In this period, the first and second motors 3a and 3b are driven simultaneously and the first and second clamps 2a and 2b rotate and revolve. Similarly, the third and fourth motors 3c and 3d are driven simultaneously and the third and fourth clamps 2c and 2d rotate and revolve. As illustrated in FIG. 16, the rotating step S4 may be performed after the revolving step S3 is performed and another revolving step S3a may be performed simultaneously with at least a portion of the rotating step S4.

According to the examples illustrated in FIGS. 13 to 15, since the revolving step S3 overlaps at least a portion of the rotating step S4, it is possible to shorten the entire period of the revolving step S3 and the rotating step S4. Therefore, it is possible to produce a satisfactory twisted electric wire CT in a shorter period of time.

According to the example illustrated in FIG. 13, since the revolving step S3 overlaps a portion of the rotating step S4 and a remaining portion of the rotating step S4 is performed after the revolving step S3 ends. Due to this, it is possible to shorten the entire period of the revolving step S3 and the rotating step S4 and to perform the rotating step S4 stably after the revolving step S3 ends.

Here, although a case in which the period (the period between t41 and t42) of the rotating step S4 is shorter than the period (the period between t31 and t32) of the revolving step S3 has been described, the period of the rotating step S4 may be longer than or the same as the period of the revolving step S3.

When the rotating step S4 ends, a collecting step S5 of collecting the twisted electric wire CT is performed. In the collecting step S5, the grip control unit 31 drives the clamp actuators 24 of the first and second gripping units 51 and 52. By doing so, the first to fourth clamps 2a to 2d are open and closed and the twisted electric wire CT is collected. A method of collecting the twisted electric wire CT is not particularly limited. For example, the electric wire twisting device may include a gripping device (not illustrated) that grips the twisted electric wire CT so that the twisted electric wire CT is delivered from the first and second gripping units 51 and 52 to the gripping device. When the first to fourth clamps 2a to 2d are open, the twisted electric wire CT falls due to its own weight. A collection tray (not illustrated) may be provided below the rail 4 so that the twisted electric wire CT is collected in the collection tray.

As described above, according to the twisting device 1 of the present embodiment, it is possible to twist the first and second electric wires C1 and C2 of which both ends are cut. It is not necessary to cut the twisted electric wire CT after twisting both electric wires C1 and C2. Therefore, since it is not necessary to perform a complicated process after twisting, it is possible to produce the twisted electric wire CT easily. The twisting device 1 includes the first motor 3a that causes the first and second clamps 2a and 2b to rotate and the second motor 3b that causes the first and second clamps 2a and 2b to revolve. Therefore, it is possible to control rotation and revolution independently. For example, it is possible to adjust the timings of rotation and revolution arbitrarily. Moreover, it is possible to adjust the number of rotations or the rotation speed of rotation and revolution arbitrarily. In this way, it is possible to realize twisting appropriate for the specifications of various kinds of electric wires.

According to the twisting device 1, it is possible to transmit the driving force of the first motor 3a to the first and second gears 16 and 17 simultaneously via the driving gear 14. Therefore, it is not necessary to prepare a driving source for driving the first gear 16 and a driving source for driving the second gear 17 individually.

However, the electric wires C1 and C2 have restoring force. When revolution only is performed when twisting the electric wires C1 and C2, force acts in a direction (that is, a direction of undoing the twisting by revolution) opposite to the revolution direction. Due to this, the tightening of the electric wires C1 and C2 decreases. However, according to the twisting device 1, the rotating step S2 as well as the revolving step S3 are performed. The rotation direction in the rotating step S2 is opposite to the revolution direction in the revolving step S3. Therefore, it is possible to cancel the force acting on the electric wires C1 and C2 (that is, the force where the electric wires C1 and C2 restore to an original state from the twisted state). Due to this, it is possible to suppress a decrease of the tightening of the electric wires C1 and C2 in the twisted electric wire CT. According to the twisting device 1, it is possible to obtain a suitable twisted electric wire CT having desired impedance characteristics.

According to the twisting device 1, the third and fourth clamps 2c and 2d as well as the first and second clamps 2a and 2b rotate. Moreover, the second holder 15B as well as the first holder 15A rotates. It is possible to cause the front ends of both electric wires C1 and C2 to rotate and revolve and to cause the rear ends of both electric wires C1 and C2 to rotate and revolve. Due to this, it is easy to equalize the twist pitches P of the twisted electric wire CT. Moreover, it is easy to equalize the residual twisting lengths L at both ends of the twisted electric wire CT. Furthermore, it is possible to shorten the processing time as compared to a case in which only the front ends of both electric wires C1 and C2 are caused to rotate and revolve.

According to the twisting device 1, the first and second clamps 2a and 2b are disposed such that a portion of them come close to the center line of revolution CL as the portion of them come close to each of the distal ends. Due to this, it is possible to dispose the front end of the first electric wire C1 and the front end of the second electric wire C2 near the center line of revolution CL. In this way, it is possible to shorten the residual twisting length L of the front end of the twisted electric wire CT. Similarly, the third and fourth clamps 2c and 2d are disposed such that a portion of them come close to the center line of revolution CL as the portion of them come close to each of the distal ends. Due to this, it is possible to dispose the rear end of the first electric wire C1 and the rear end of the second electric wire C2 near the center line of revolution CL. In this way, it is possible to shorten the residual twisting length L of the rear end of the twisted electric wire CT.

According to the twisting device 1, the first and second motors 3a and 3b are located forward of the first and second clamps 2a and 2b. The first and second motors 3a and 3b are arranged in the direction perpendicular to the center line of revolution CL. The third and fourth motors 3c and 3d are located rearward of the third and fourth clamps 2c and 2d. The third and fourth motors 3c and 3d are arranged in the direction perpendicular to the center line of revolution CL. Due to this, it is possible to simplify the configuration of the twisting device 1 and to decrease the size thereof.

In the present embodiment, before the first to fourth clamps 2a to 2d are caused to revolve in the revolving step S3, the first to fourth clamps 2a to 2d are caused to rotate in a direction opposite to the revolution direction in the rotating step S2. With this rotation, the first and second electric wires C1 and C2 are twisted in the direction opposite to the revolution direction in advance. Therefore, restoring force occurs in the first and second electric wires C1 and C2 such that the first and second electric wires C1 and C2 return in the revolution direction. The restoring force acts as such force that the first and second electric wires C1 and C2 are tightened each other when the first to fourth clamps 2a to 2d are caused to revolve. Therefore, according to the present embodiment, the tightening of the first and second electric wires C1 and C2 increases and a gap is not easily formed between the first and second electric wires C1 and C2. Therefore, it is possible to obtain a satisfactory twisted electric wire CT having desired impedance characteristics.

When the second motor 3b is driven after driving the first motor 3a, twisting of the first and second electric wires C1 and C2 starts, and the force of revolution of the first and second clamps 2a and 2b propagates sequentially from the front ends of the first and second electric wires C1 and C2 toward the central portions thereof. Similarly, when the fourth motor 3d is driven after driving the third motor 3c, twisting of the first and second electric wires C1 and C2 starts, and the force of revolution of the third and fourth clamps 2c and 2d propagates sequentially from the rear ends of the first and second electric wires C1 and C2 toward the central portions thereof. As a result, the residual twisting lengths L of the front end and the rear end of the twisted electric wire CT are equalized and the twist pitches P thereof are equalized.

As illustrated in FIG. 12 and the like, starting the rotating step S4 after starting the revolving step S3 makes it possible to adjust the residual twisting length L of the twisted electric wire CT. In the present embodiment, since the first to fourth clamps 2a to 2d are rotated in the direction opposite to the revolution direction in the rotating step S4, it is possible to decrease the residual twisting length L of the twisted electric wire CT. Therefore, it is possible to suppress an increase in characteristic impedance of the twisted electric wire CT and to easily control the characteristic impedance to be within a desired range. Therefore, it is possible to obtain a satisfactory twisted electric wire CT.

Modification of First Embodiment

Hereinabove, the twisting device 1 according to the first embodiment has been described. However, the twisting device 1 is an example only and various other modifications may be considered. Next, several modifications will be described.

In the embodiment described above, although the gear 13 is interposed between the gear 18 and the driving gear 14, it is not particularly limited thereto. The gear 18 and the driving gear 14 may be directly engaged with each other. Moreover, a power transmission member interposed between the first motor 3a and the driving gear 14 is not limited to the gear but may be a power transmission belt, a chain, or the like. The first motor 3a and the driving gear 14 may be connected directly.

The rotating actuator and the revolving actuator are not necessarily limited to motors. The first to fourth motors 3a to 3d may be other actuators that generate driving force. For example, an air cylinder or the like can be used as the other actuators.

In the embodiment described above, the first and second gripping devices 11 and 12 grip the front ends and the rear ends of the first and second electric wires C1 and C2, respectively. However, the front and rear used in the above description are directions determined for the sake of convenience only. The first and second gripping devices 11 and 12 may be configured to grip the rear ends and the front ends of the first and second electric wires C1 and C2, respectively.

In the embodiment described above, the first gripping device 11 executes both rotation and revolution of the first and second electric wires C1 and C2. The second gripping device 12 executes both rotation and revolution of the first and second electric wires C1 and C2. However, the second gripping device 12 may not execute rotation of the first and second electric wires C1 and C2 and may not execute revolution thereof. For example, the third and fourth clamps 2c and 2d may be configured to be non-rotatable. The second holder 15B may be configured to be non-rotatable.

In the embodiment described above, the rear end of the first electric wire C1 is gripped by the third clamp 2c and the rear end of the second electric wire C2 is gripped by the fourth clamp 2d. However, the rear end of the first electric wire C1 and the rear end of the second electric wire C2 may be gripped by the same clamp. That is, the rear ends of two electric wires C1 and C2 may be gripped simultaneously by one clamp.

The twisting device 1 according to the embodiment described above is configured to twist two electric wires C1 and C2. However, the electric wire twisting device according to the present invention may be configured to twist three or more electric wires. In this case, the first clamp 2a, the gear 16, and the like may be provided in three or more sets.

In the embodiment described above, although all of the first to fourth clamps 2a to 2d are inclined with respect to the center line of revolution CL, at least one of the first to fourth clamps 2a to 2d may be parallel to the center line of revolution CL.

Figure 17:
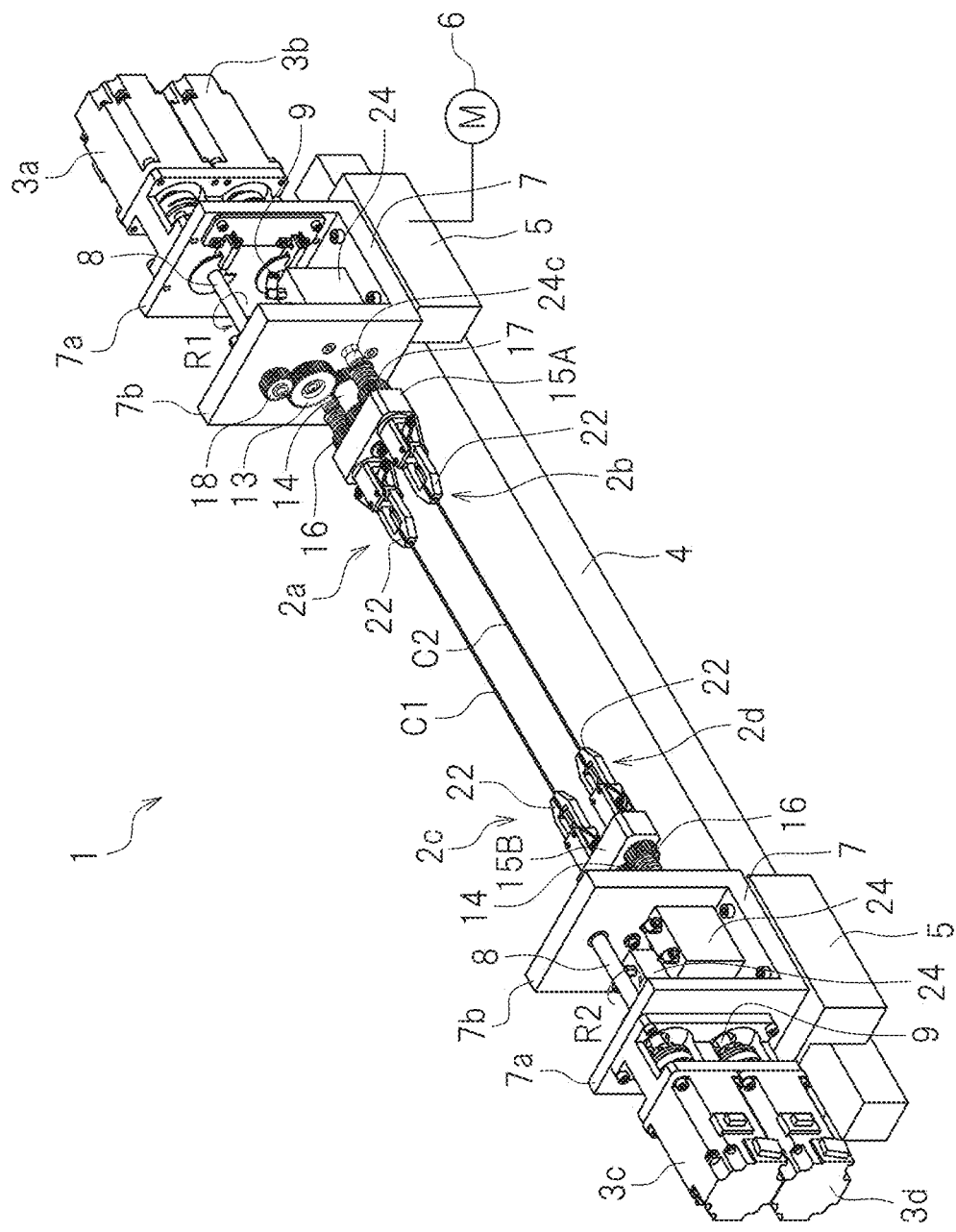
FIG. 17 is a perspective view of an electric wire twisting device according to a modification.

As illustrated in FIG. 17, the first to fourth clamps 2a to 2d may be disposed in parallel to the center line of revolution CL. In this case, the shafts 20 of the first to fourth clamps 2a to 2d are disposed in parallel to the center line of revolution CL. That is, a center line of rotation (a first center line of rotation) of the first clamp 2a, a center line of rotation (a second center line of rotation) of the second clamp 2b, a center line of rotation (a third center line of rotation) of the third clamp 2c, a center line of rotation (a fourth center line of rotation) of the fourth clamp 2d, and the center line of revolution are parallel to each other. A spur gear can be used as the driving gear 14, the first gear 16, and the second gear 17.

Figure 18:
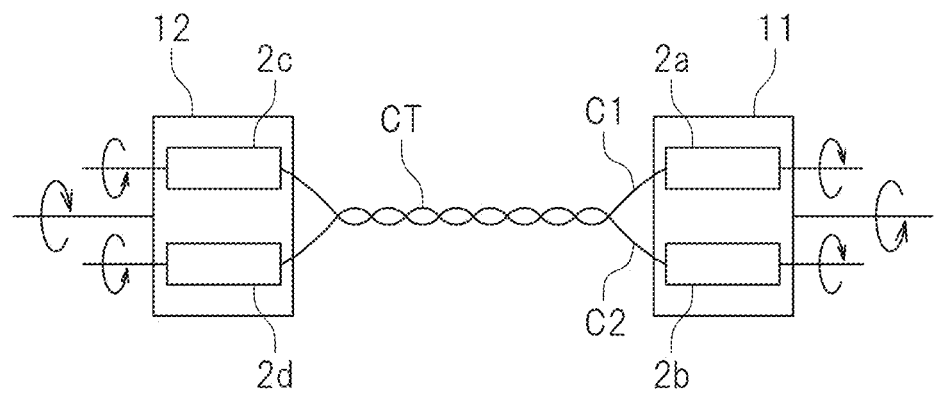
FIG. 18 is a schematic diagram of the electric wire twisting device according to the first embodiment.

As schematically illustrated in FIG. 18, in the embodiment described above, the first and second clamps 2a and 2b are provided in the first gripping device 11, and the third and fourth clamps 2c and 2d are provided in the second gripping device 12. Both the first and second gripping devices 11 and 12 can rotate and all of the first to fourth clamps 2a to 2d can rotate. However, the configurations of the first and second gripping devices 11 and 12 are not particularly limited. Next, a modification in which the first and second gripping devices 11 and 12 have different configurations will be described.

Figure 19:
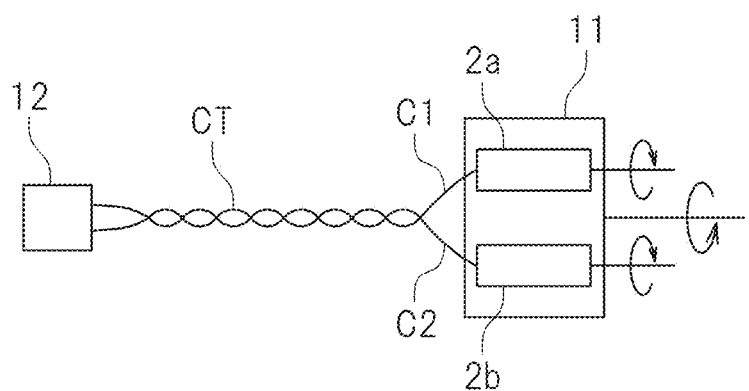
FIG. 19 is a schematic diagram of an electric wire twisting device according to a modification.

As illustrated in FIG. 19, the second gripping device 12 may not include the third and fourth rotatable clamps 2c and 2d and may be configured to be non-rotatable. In this modification, although the first and second motors 3a and 3b are provided, the third and fourth motors 3c and 3d are not necessary. The revolving step S3 is performed when the first gripping device 11 rotates, and the rotating steps S2 and S4 are performed when the first and second clamps 2a and 2b rotate. According to this modification, a rotating mechanism is not required in the second gripping device 12. Therefore, it is possible to simplify the configuration of the second gripping device 12. The second gripping device 12 may include a single clamp that grips both the first and second electric wires C1 and C2. When both electric wires C1 and C2 are gripped by a single clamp, a gripping position of the first electric wire C1 and a gripping position of the second electric wire C2 by the second gripping device 12 can approach each other more closely. Therefore, it is possible to further shorten the residual twisting length of the twisted electric wire CT at the position closer to the second gripping device 12.

Figure 20:
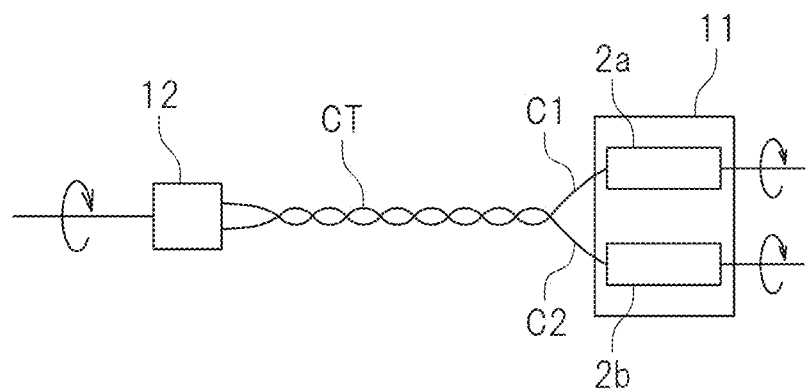
FIG. 20 is a schematic diagram of an electric wire twisting device according to a modification.

In a reference example illustrated in FIG. 20, although the first gripping device 11 includes the first and second rotatable clamps 2a and 2b, the first gripping device 11 is configured to be non-rotatable. The second gripping device 12 does not include the third and fourth rotatable clamps 2c and 2d and is configured to be rotatable. In this example, a motor that rotates the first and second clamps 2a and 2b and a motor that rotates the second gripping device 12 may be included. The revolving step S3 is performed when the second gripping device 12 rotates. The rotating steps S2 and S4 are performed when the first and second clamps 2a and 2b rotate. According to this example, it is not necessary for one gripping device to include a mechanism for revolution and a mechanism for rotation. Due to this, it is possible to simplify the configuration of the first and second gripping devices 11 and 12. In this example, the second gripping device 12 may include a single clamp that grips both the first and second electric wires C1 and C2. In this example, it is possible to shorten the residual twisting length of the twisted electric wire CT at the position closer to the second gripping device 12.

In the embodiment described above, although the rotating step S2 is performed, the rotating step S2 is not necessary and can be omitted. The rotating step S4 is not necessary and can be omitted.

In the embodiment described above, although the collecting step S5 is performed after the rotating step S4 is performed (see FIG. 7), another revolving step may be performed between the rotating step S4 and the collecting step S5. That is, after adjusting the residual twisting length of the twisted electric wire CT in the rotating step S4, an additional revolving step may be performed.

In the embodiment described above, in order to shorten the residual twisting length of the twisted electric wire CT, both electric wires C1 and C2 are rotated in the direction opposite to the revolution direction in the rotating step S4.

However, the rotating step S4 may be used for increasing the residual twisting length as well as shortening the residual twisting length. The rotating step S4 may be a step of causing both electric wires C1 and C2 to rotate in the same direction as the revolution direction.

Second Embodiment

In the first embodiment, the rotating step S2 and the revolving step S3 are performed by the pair of gripping units 51 and 52. However, the gripping units 51 and 52 may perform any one of the rotating step S2 and the revolving step S3 and another pair of gripping units may perform the other step.

Figure 21:
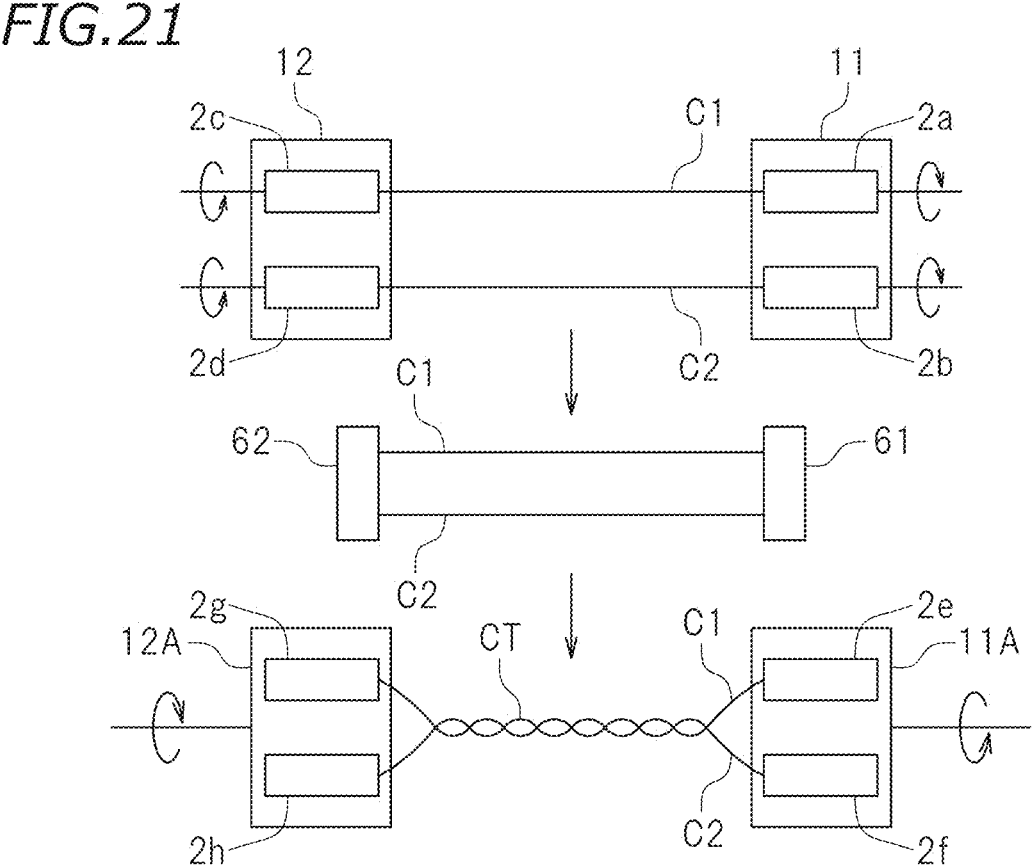
FIG. 21 is a schematic diagram of an electric wire twisting device according to a second embodiment.

For example, as illustrated in FIG. 21, the twisting device 1 may include a third gripping device 11A that grips the front ends of both electric wires C1 and C2 and a fourth gripping device 12A that grips the rear ends of both electric wires C1 and C2 in addition to the first and second gripping devices 11 and 12. The twisting device 1 may further include a first conveying device 61 that conveys the front ends of both electric wires C1 and C2 from the first gripping device 11 to the third gripping device 11A and a second conveying device 62 that conveys the other set of ends of both electric wires C1 and C2 from the second gripping device 12 to the fourth gripping device 12A. The third gripping device 11A may include a clamp 2e that grips the front end of the first electric wire C1 and a clamp 2f that grips the front end of the second electric wire C2. The fourth gripping device 12A may include a clamp 2g that grips the rear end of the first electric wire C1 and a clamp 2h that grips the rear end of the second electric wire C2. Actuators (not illustrated) configured as a motor or the like are connected to the third and fourth gripping devices 11A and 12A, respectively. In the present embodiment, the rotating step S2 is performed when the first to fourth clamps 2a to 2d rotate and the revolving step S3 is performed when the third and fourth gripping devices 11A and 12A rotate.

In the present embodiment, a conveying step is performed after the rotating step S2 is performed. In the conveying step, the first conveying device 61 receives the front ends of both electric wires C1 and C2 from the first gripping device 11 and the second conveying device 62 receives the rear ends of both electric wires C1 and C2 from the second gripping device 12. The first conveying device 61 moves toward the third gripping device 11A and the second conveying device 62 moves toward the fourth gripping device 12A. After that, the first conveying device 61 delivers the front end of the first electric wire C1 to the clamp 2e and delivers the front end of the second electric wire C2 to the clamp 2f. The second conveying device 62 delivers the rear end of the first electric wire C1 to the clamp 2g and delivers the rear end of the second electric wire C2 to the fourth clamp 2h.

After the conveying step is performed, the third and fourth gripping devices 11A and 12A perform the revolving step S3. That is, the third and fourth gripping devices 11A and 12A rotate and the first and second electric wires C1 and C2 are twisted.

According to the present embodiment, the rotating step S2 and the revolving step S3 are performed in separate places. Due to this, although the revolving step S3 is performed subsequently to the rotating step S2 in a processing order, the rotating step S2 and the revolving step S3 may be performed simultaneously. Rotation of one set of electric wires C1 and C2 and revolution of another set of electric wires C1 and C2 can be performed simultaneously. When twisting of a plurality of sets of electric wires C1 and C2 is performed successively, it is possible to perform the rotating step S2 and the revolving step S3 stably and to shorten the entire processing time. Therefore, it is possible to improve the production efficiency of the twisted electric wires CT.

The third gripping device 11A may include a single clamp that grips the front ends of the first and second electric wires C1 and C2 instead of the clamps 2e and 2f. The fourth gripping device 12A may include a single clamp that grips the rear ends of the first and second electric wires C1 and C2 instead of the clamps 2g and 2h.

In the first embodiment, both the revolving step S3 and the rotating step S4 are performed by the pair of gripping units 51 and 52. However, the revolving step S3 and the rotating step S4 may be performed by different gripping units.

Figure 22:
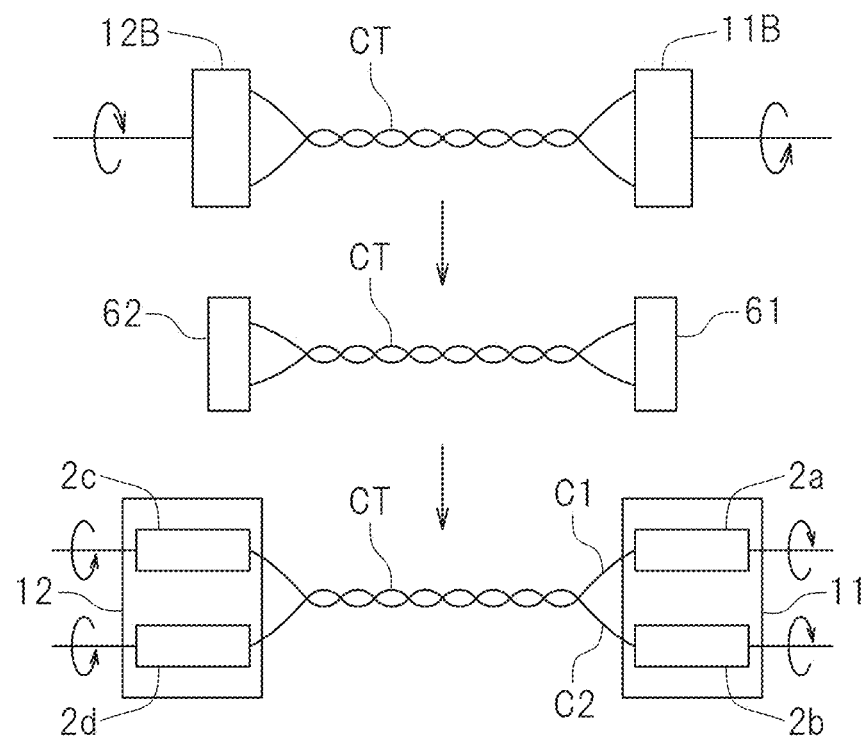
FIG. 22 is a schematic diagram of an electric wire twisting device according to a modification.

As illustrated in FIG. 22, the twisting device 1 may include a gripping device 11B that grips one set of ends of both electric wires C1 and C2 and a gripping device 12B that grips the other set of ends of both electric wires C1 and C2 in addition to the first and second gripping devices 11 and 12. The twisting device 1 may further include a first conveying device 61 that conveys one set of ends of both electric wires C1 and C2 from the gripping device 11B to the first gripping device 11 and a second conveying device 62 that conveys the other set of ends of both electric wires C1 and C2 from the gripping device 12B to the second gripping device 12. The gripping devices 11B and 12B are configured to be rotatable. The twisting device 1 includes a motor (not illustrated) that drives the gripping devices 11B and 12B.

In the twisting device 1 illustrated in FIG. 22, the rotating step S2 is not performed. The revolving step S3 is performed when the gripping devices 11B and 12B rotate.

A conveying step is performed after the revolving step S3 is performed. In the conveying step, the first conveying device 61 receives one set of ends of both electric wires C1 and C2 from the gripping device 11B and the second conveying device 62 receives the other set of ends of both electric wires C1 and C2 from the gripping device 12B. The first conveying device 61 moves toward the first gripping device 11 and the second conveying device 62 moves toward the second gripping device 12. After that, the first conveying device 61 delivers one end of the first electric wire C1 to the first clamp 2a and delivers one end of the second electric wire C2 to the second clamp 2b. The second conveying device 62 delivers the other end of the first electric wire C1 to the third clamp 2c and delivers the other end of the second electric wire C2 to the fourth clamp 2d.

After the conveying step is performed, the rotating step S4 is performed by the first and second gripping devices 11 and 12. That is, the first to fourth clamps 2a to 2d rotate and the residual twisting length of the twisted electric wire CT is adjusted.

According to the present embodiment, the revolving step S3 and the rotating step S4 are performed in separate places. Due to this, although the rotating step S4 is performed subsequently to the revolving step S3 in a processing order, the revolving step S3 and the rotating step S4 may be performed simultaneously. Revolution of one set of electric wires C1 and C2 and rotation of another set of electric wires C1 and C2 can be performed simultaneously. Therefore, when twisting of a plurality of sets of electric wires C1 and C2 is performed successively, it is possible to perform the rotating step S4 stably and to shorten the entire processing time.

In the revolving step S3, it is sufficient to rotate at least one of the gripping devices 11B and 12B, and it is not necessary to rotate both. In the rotating step S4, it is sufficient to rotate at least one of the first and third clamps 2*a* and 2*c* and at least one of the second and fourth clamps 2*b* and 2*d*, and it is not necessary to rotate all of the first to fourth clamps 2*a* to 2*d*.

Figure 23:
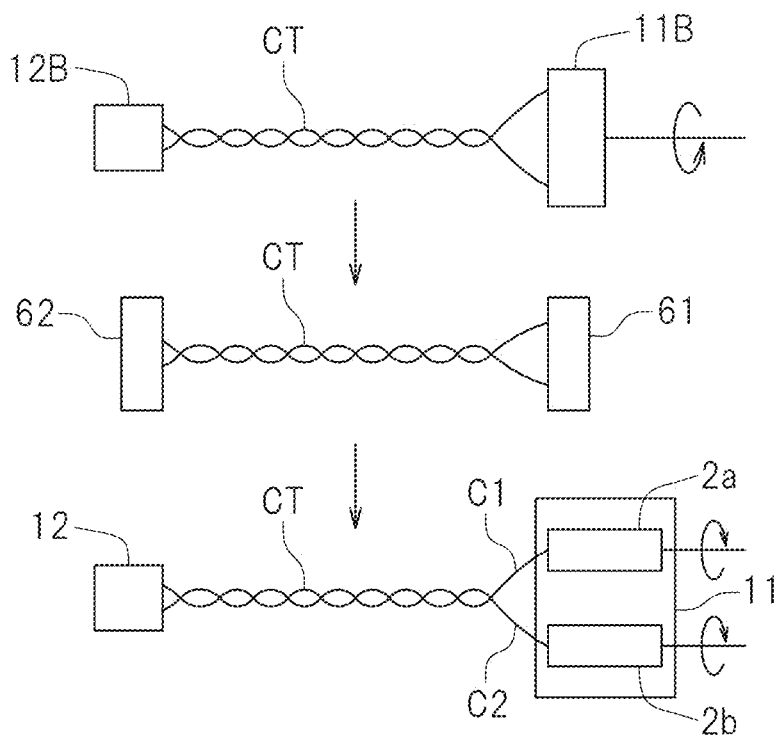
FIG. 23 is a schematic diagram of an electric wire twisting device according to a modification.

For example, as illustrated in FIG. 23, the gripping device 12B may be configured to be non-rotatable. The second gripping device 12 may not include the third and fourth rotatable clamps 2*c* and 2*d*.

In the embodiment described above, although the first conveying device 61 that conveys one set of ends of both electric wires C1 and C2 from the gripping device 11B to the first gripping device 11 and the second conveying device 62 that conveys the other set of ends of both electric wires C1 and C2 from the gripping device 12B to the second gripping device 12 are included. However, the first conveying device 61 and the first gripping device 11 may be omitted, and alternatively, the second conveying device 62 and the second gripping device 12 may be omitted. For example, in the configuration illustrated in FIG. 22 or 23, the second conveying device 62 and the second gripping device 12 may be omitted. In this case, in the conveying step subsequent to the revolving step S3, although the first conveying device 61 delivers one set of ends of both electric wires C1 and C2 from the gripping device 11B to the first gripping device 11, the gripping device 12B continues gripping the other set of ends of both electric wires C1 and C2. In the rotating step S4 subsequent to the conveying step, the first and second clamps 2*a* and 2*b* of the first gripping device 11 rotate and the residual twisting length of the twisted electric wire CT is adjusted.

Although the description is omitted, various modifications similar to those of the first embodiment may occur in the second embodiment.

Third Embodiment

The twisting device 1 may include another device in addition to the above-described structure. The twisting device 1 according to the third embodiment includes a pitch measuring device 90 that measures the twisting pitch (a twist pitch) of the twisted electric wire CT. That is, the twisting device 1 according to the third embodiment produces a twisted electric wire CT by twisting the first and second electric wires C1 and C2 and then measures the twist pitch of the twisted electric wire CT.

In the twisting device 1 according to the third embodiment, the pitch measuring device 90 to be described later is applied to the twisting device 1 according to the first or second embodiment (including the modifications thereof). However, the twisting device in which the pitch measuring device 90 is included is not limited to the twisting device 1 described above. In the following description, the pitch measuring device 90 provided in a twisting device 1A different from the twisting device 1 described above will be described.

In the following description, the directions indicated by symbols F, Rr, L, R, U, and D in the drawings indicate the front, rear, left, right, up, and down unless particularly stated otherwise. However, these directions are determined for the sake of convenience only.

Figure 24:
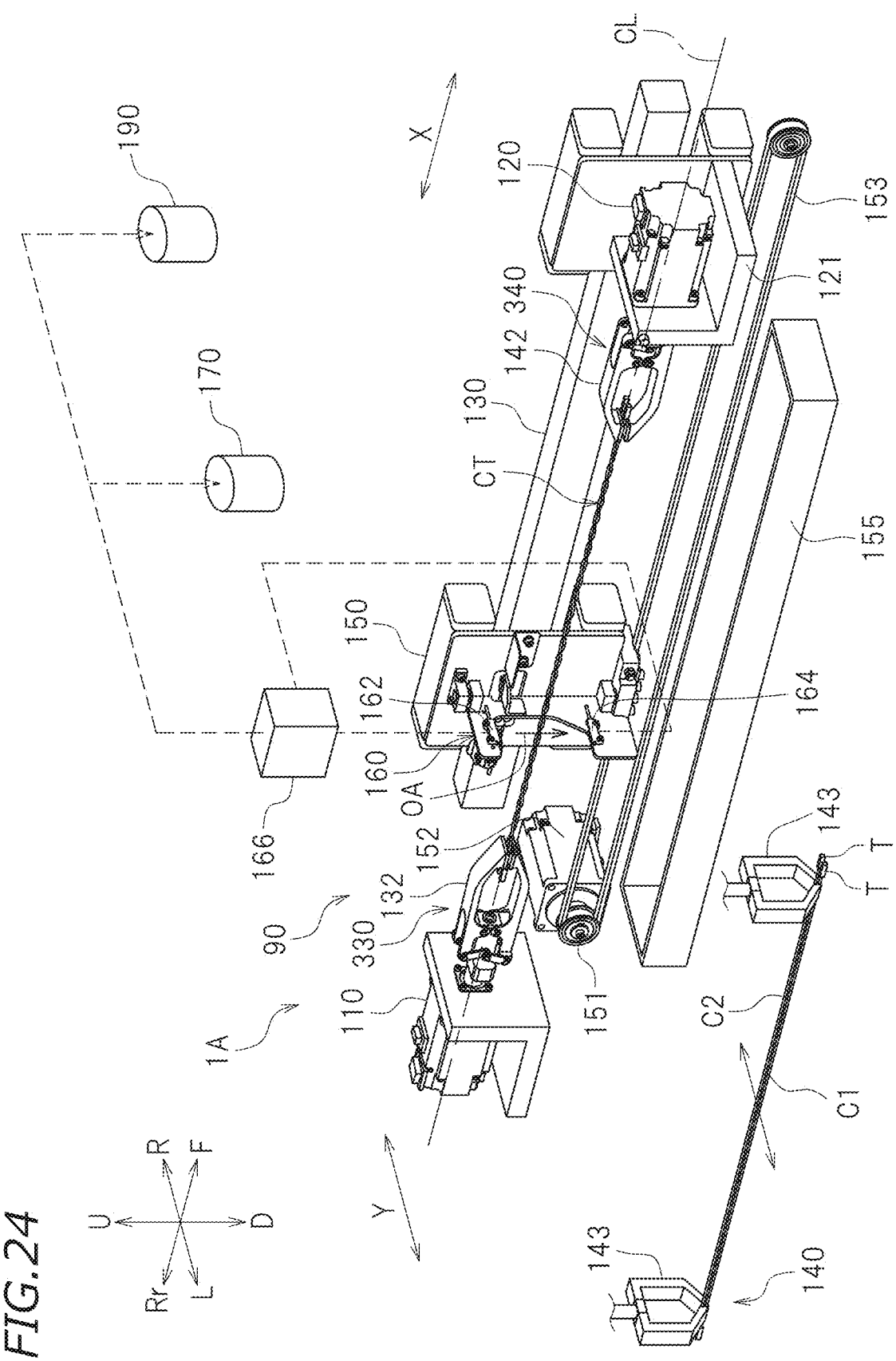
FIG. 24 is a perspective view of an electric wire twisting device having a pitch measuring device.

As illustrated in FIG. 24, the twisting device 1A includes a first gripping device 330, a second gripping device 340, a motor 110 that causes the first gripping device 330 to rotate around the center line of revolution CL, and a motor 120 that causes the second gripping device 340 to rotate around the center line of revolution CL. Moreover, the twisting device 1A includes the pitch measuring device 90, a rail 130, and a conveying unit 140. The pitch measuring device 90 includes a moving unit 150, a pitch sensor 160, and a processor 170. The twisting device 1A produces a twisted electric wire CT by twisting the first and second electric wires C1 and C2 in which a terminal T is pressure-joined to both ends thereof.

The first gripping device 330 includes a grip arm 132 that holds the rear ends of the first and second electric wires C1 and C2 and a clamp actuator (not illustrated) that opens and closes the grip arm 132. A motor, an air cylinder, a hydraulic cylinder, and the like, for example, can be suitably used as the clamp actuator. The second gripping device 340 has a configuration similar to the first gripping device 330. The second gripping device 340 includes a grip arm 142 that can be open and closed and a clamp actuator (not illustrated) that opens and closes the grip arm 142.

The second gripping device 340 has a slider 121 that is engaged with the rail 130. The second gripping device 340 is configured to change the distance to the first gripping device 330 by moving on the rail 130. The second gripping device 340 is engaged with a ball screw or the like driven by a motor, for example, so as to slide on the rail 130 by the power of the motor. In the present embodiment, the second gripping device 340 only slides on the rail 130 among the first and second gripping devices 330 and 340. However, the first gripping device 330 only may slide on the rail 130 or both the first and second gripping devices 330 and 340 may slide on the rail 130. The driving source is not limited to the motor and the driving force transmission means is not limited to the ball screw.

The moving unit 150 is disposed between the first and second gripping devices 330 and 340. The moving unit 150 is engaged with the rail 130. The moving unit 150 can move on the rail 130. The moving unit 150 can move toward the first gripping device 330 (rearward) and move toward the second gripping device 340 (forward). Hereinafter, the moving direction of the moving unit 150 will be denoted by X. In this example, the moving direction X is a front-rear direction. A belt 153 wound around a pulley 151 of a motor 152, for example, is connected to the moving unit 150. The moving unit 150 can slide along the rail 130 according to the rotation of the motor 152. In this example, although the moving unit 150 is engaged with the rail 130 the same as the rail with which the second gripping device 340 is engaged, the moving unit 150 may be engaged with a different rail. However, when the moving unit 150 and the second gripping device 340 are engaged with the same rail 130, it is possible to reduce the number of components as compared to a case in which individual rails are provided.

The pitch sensor 160 is supported by the moving unit 150. The pitch sensor 160 detects the position of the twisted electric wire CT with respect to the direction Y perpendicular to the direction X. In this example, the direction Y is a left-right direction of the twisting device 1A. The position of the pitch sensor 160 is adjusted so that the center line of rotation (that is, the center line of revolution) CL of the first and second gripping devices 330 and 340 passes through a detection region. The twisted electric wire CT is held on the center line of revolution CL. An optical sensor such as a photoelectric sensor or a laser sensor, for example, is used as the pitch sensor 160. For example, a transmissive photoelectric sensor, a reflective photoelectric sensor, or a laser displacement sensor can be ideally used. A proximity sensor, an image sensor, or the like can be used. A magnetic sensor that supplies current to the twisted electric wire CT and measures a magnetic field around the twisted electric wire CT may be used.

The motors 110 and 120 are preferably configured as a servo motor so as to be able to detect a rotational position.

The conveying unit 140 is disposed leftward of the pitch measuring device 90, for example. The conveying unit 140 includes two conveying arms 143 and a moving mechanism (not illustrated) that moves the conveying arms 143. The conveying arm 143 has a mechanism similar to the grip arm 132 or 142. The conveying arm 143 can grip the first and second electric wires C1 and C2 simultaneously in a state in which the electric wires are arranged in the left-right direction. The moving mechanism can move the conveying arm 143 in the left-right direction. The moving mechanism can convey the first and second electric wires C1 and C2 up to the position of the center line of revolution CL by moving the conveying arm 143 rightward.

The processor 170 calculates the twist pitch of the twisted electric wire CT on the basis of the surface position of the twisted electric wire CT detected by the pitch sensor 160.

Figure 25:
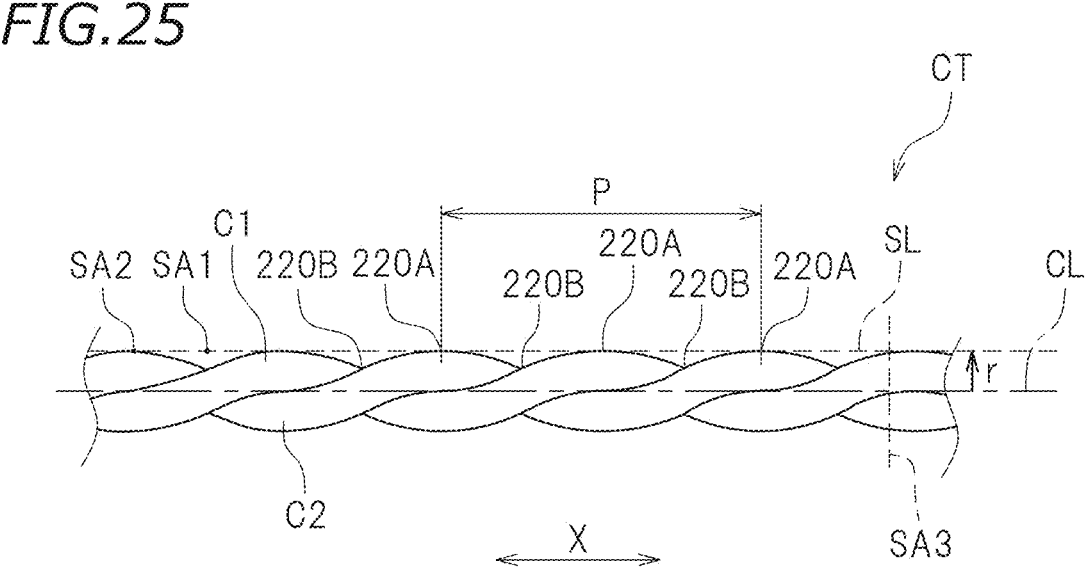
FIG. 25 is a schematic top view of a portion of a twisted electric wire.

As illustrated in FIG. 25, the twisted electric wire CT has peaks 220A and troughs 220B. The peaks 220A and the troughs 220B are alternately arranged adjacent to each other. Two sets of peaks 220A and troughs 220B form one cycle of twisting of the twisted electric wire CT. The twist pitch P can be defined as the distance between the peaks 220A of the first electric wire CT or the distance between the peaks 220A of the second electric wire C2, for example. For example, the positions of respective peaks 220A may be detected along a detection line SL and the distance obtained by summing the distances between two sets of adjacent and successive peaks 220A may be detected as the twist pitch P. The position of the detection line SL is not particularly limited. For example, the distance between troughs 220B of the first electric wire C1 or the distance between troughs 220B of the second electric wire C2 may be defined as the twist pitch P. Whether the twist pitch P is adequate or not is determined, for example, on the basis of whether the measured twist pitches P fall within a predetermined numerical range. Alternatively, whether the twist pitch P is adequate or not is determined on the basis of whether an average twist pitch P falls within a predetermined numerical range.

As illustrated in FIG. 24, the pitch sensor 160 according to the present embodiment is a transmissive photoelectric sensor having a projector 162 and a receiver 164. In the following description, the pitch sensor 160 will be referred to as a photoelectric sensor 160. The photoelectric sensor 160 determines the presence of an obstacle on the basis of whether the receiver 164 receives light emitted by the projector 162. The receiver 164 is connected to an amplifier 166. The amplifier 166 outputs a signal when the receiver 164 does not receive light, for example. Alternatively, the amplifier 166 may output a signal when the receiver 164 receives light.

The projector 162 and the receiver 164 face each other with the twisted electric wire CT disposed therebetween. For example, the projector 162 is installed above the twisted electric wire CT and the receiver 164 is installed below the twisted electric wire CT. In this example, the direction of an optical axis OA of the photoelectric sensor 160 is a vertical direction. However, the vertical relation of the projector 162 and the receiver 164 may be reversed. Moreover, the projector 162 and the receiver 164 may not necessarily be disposed so that the optical axis OA is in the vertical direction. For example, the projector 162 and the receiver 164 may be disposed so that the optical axis OA is inclined from the vertical direction. The photoelectric sensor 160 detects the position of the twisted electric wire CT while moving in the direction X. The photoelectric sensor 160 detects a portion of the twisted electric wire CT positioned on the detection line SL (see FIG. 25) which is separated by a predetermined distance in a radial direction r from the center of the twisted electric wire CT. If the twisted electric wire CT is twisted at a constant pitch, the amplifier 166 of the photoelectric sensor 160 outputs a signal at a constant interval. This signal is input to the processor 170, and the processor 170 calculates the twist pitch.

When a light transmissive sensor like the present embodiment is used, a region SA1 (see FIG. 25) in which both the first electric wire C1 and the second electric wire C2 are not present on the detection line SL is detected. On the other hand, when a reflective displacement sensor such as a laser displacement sensor, for example, is used, the center line CL is used as a detection line and the respective portions of the first and second electric wires C1 and C2 are detection targets. When an optical sensor that emits light in a strip-like shape perpendicular to the moving direction X of the moving unit 150 is used, a region SA3 including a region in which the first or second electric wire C1 or C2 is present and a region in which both the first and second electric wires C1 and C2 are not present is a detection target.

Next, an operation of the twisting device 1A will be described. First, the conveying arm 143 of the conveying unit 140 moves rightward while gripping the first and second electric wires C1 and C2. Subsequently, the conveying arm 143 delivers the first and second electric wires C1 and C2 to the first and second gripping devices 330 and 340.

Subsequently, the motor 110 rotates the first gripping device 330 and the motor 120 rotates the second gripping device 340. The rotation direction of the first gripping device 330 is opposite to the rotation direction of the second gripping device 340. With rotation of the first and second gripping devices 330 and 340, the first and second electric wires CT are twisted. When the first and second electric wires C1 and C2 are twisted, an apparent length decreases. Therefore, the second gripping device 340 moves toward the first gripping device 330 with the progress of twisting. The second gripping device 340 may move at a predetermined speed or may move so that the tension of the first and second electric wires C1 and C2 becomes constant.

In this way, the twisted electric wire CT is produced. When the twisted electric wire CT is produced, the motors 110 and 120 stop and the rotation of the first and second gripping devices 330 and 340 stop. Subsequently, the moving unit 150 moves from one of the first and second gripping devices 330 and 340 toward the other gripping device and the pitch sensor 160 measures the position of the twisted electric wire CT. The processor 170 receives a signal from the pitch sensor 160 and calculates the twist pitch of the twisted electric wire CT. Moreover, the processor 170 determines whether the quality of the twisted electric wire CT is satisfactory on the basis of whether the twist pitch is within a predetermined numerical range.

According to the pitch measuring device 90 of the present embodiment, the moving unit 150 moves in the longitudinal direction of the twisted electric wire CT in a state in which the first and second gripping devices 330 and 340 hold the ends of the first and second electric wires C1 and C2. When the moving unit 150 moves, the twist pitch of the twisted electric wire CT is measured. Due to this, it is not necessary to cut the ends of the twisted electric wire CT and pressure-joint the terminal T to the ends after the twist pitch is measured. Therefore, there is no possibility that the quality of the twisted electric wire CT deteriorates after the pitch measurement. Moreover, the twist pitch is calculated on the basis of the surface position of the twisted electric wire CT detected by the pitch sensor 160. Due to this, it is possible to measure the pitch with high accuracy. Therefore, according to the pitch measuring device 90, it is possible to perform high-accuracy pitch measurement and to maintain the quality of the twisted electric wire CT after the measurement.

Figure 26:
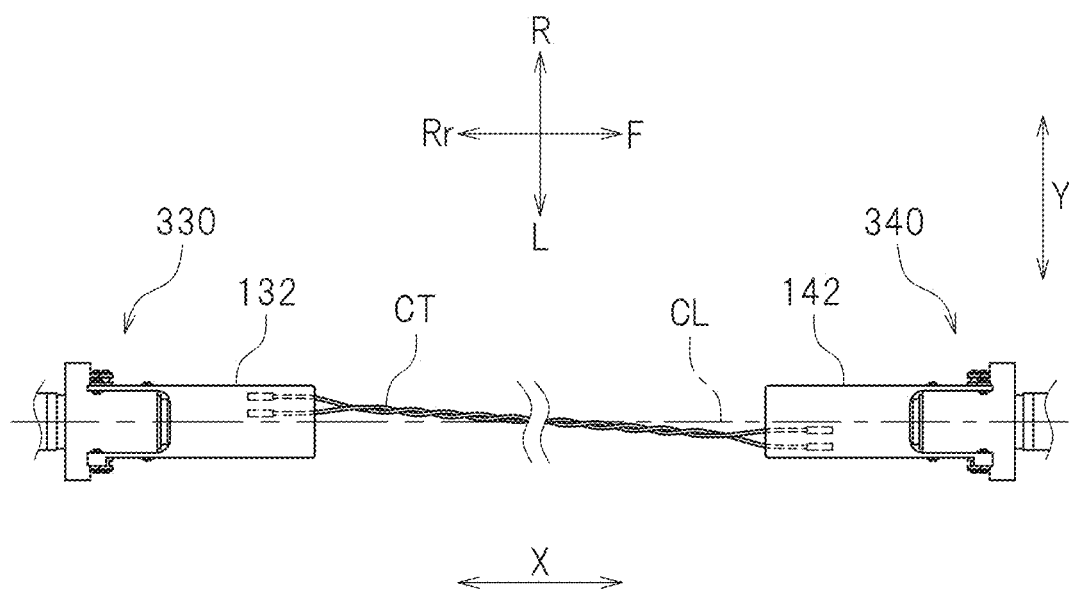
FIG. 26 is a schematic diagram illustrating a state in which a twisted electric wire is inclined with respect to a moving direction of a moving unit.

However, a variation may occur in the gripping position of the first and second electric wires C1 and C2 by the first and second gripping devices 330 and 340. For example, as illustrated in FIG. 26, the first gripping device 330 may hold one set of ends of the first and second electric wires C1 and C2 on the right of the center line of revolution CL, and the second gripping device 340 may hold the other set of ends of the first and second electric wires C1 and C2 on the left of the center line of revolution CL. In this case, when the first and second gripping devices 330 and 340 are rotated, the twisted electric wire CT is tilted from the center line of revolution CL when seen from the above. When the twisted electric wire CT is tilted in this manner, an error may occur in the pitch measured by the photoelectric sensor 160.

Figure 27:
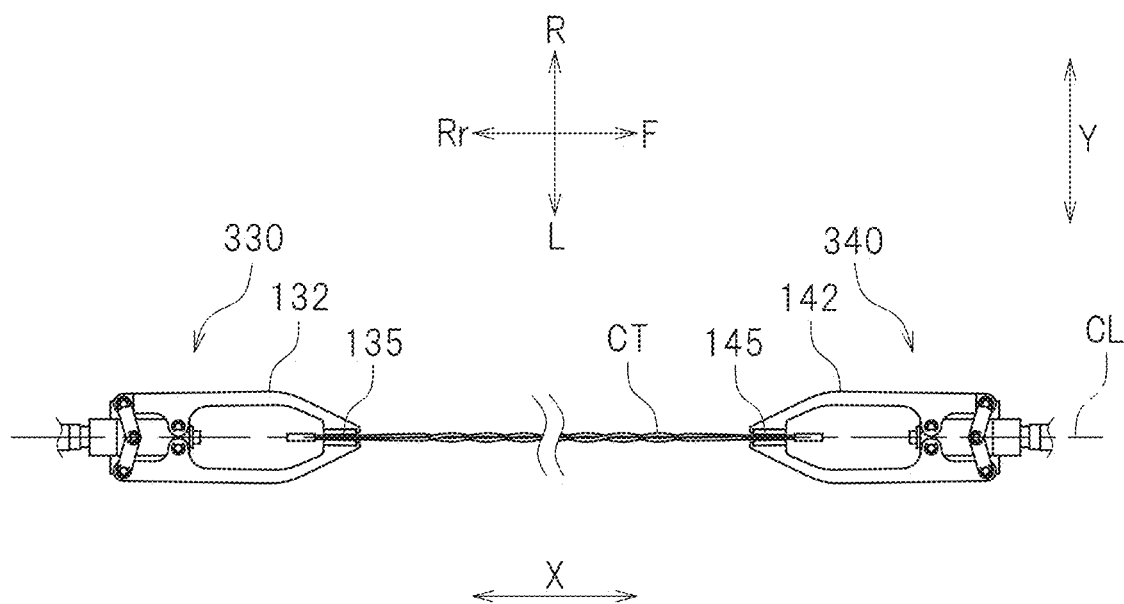
FIG. 27 is a schematic top view of a twisted electric wire when a gripping device is oriented vertically.

Therefore, the first and second gripping devices 330 and 340 (see FIGS. 24 and 26) oriented horizontally when receiving the first and second electric wires C1 and C2 may be oriented vertically when measuring the pitch as illustrated in FIG. 27. The first and second gripping device 330 and 340 being oriented vertically refers to a state in which a gripping surface 135 of the grip arm 132 and a gripping surface 145 of the grip arm 142 are oriented vertically. On the other hand, the first and second gripping devices 330 and 340 being oriented horizontally refers to a state in which the gripping surfaces 135 and 145 are oriented horizontally. In this manner, before the pitch measurement, the position of the first and second gripping devices 330 and 340 may be changed by 90° from a position wherein the first and second gripping devices receive the first and second electric wires C1 and C2 from the conveying arm 143. In this way, as illustrated in FIG. 27, the twisted electric wire CT is positioned on the center line of revolution CL when seen from the above. When the first and second gripping devices 330 and 340 are oriented vertically in this manner, the twisted electric wire CT is held within a vertical plane including the optical axis OA of the photoelectric sensor 160 and the moving direction X of the moving unit 150 or within a vertical plane parallel to the vertical plane. Due to this, it is possible to perform the pitch measurement by the photoelectric sensor 160 satisfactorily regardless of the shift in the gripping position.

When the twisted electric wire CT is disposed within a plane that includes the optical axis OA of the photoelectric sensor 160 and is parallel to the moving direction X of the moving unit 150, although the first and second gripping devices 330 and 340 may be rotated around the center line of revolution CL, the photoelectric sensor 160 may be rotated around the center line of revolution CL. In the present embodiment, the motor 110 is configured to rotate the first gripping device 330 and the motor 120 is configured to rotate the second gripping device 340. Due to this, a dedicated rotating mechanism for disposing the twisted electric wire CT within the plane is not necessary. However, a dedicated rotating mechanism may be provided in the first and second gripping devices 330 and 340 or the photoelectric sensor 160. In order to dispose the twisted electric wire CT in the plane, a rotating mechanism may be provided in addition to the motors 110 and 120.

Figure 28:
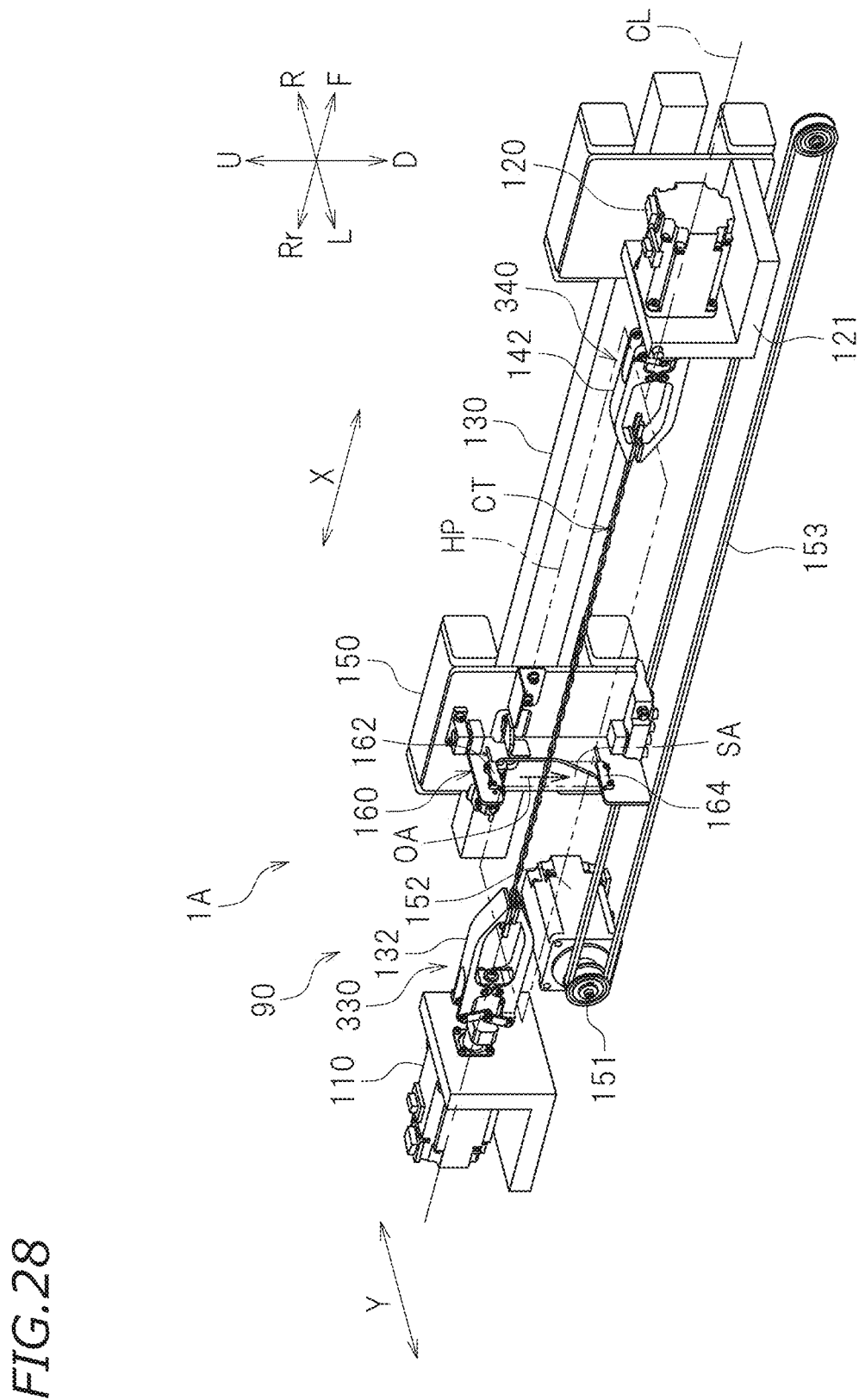
FIG. 28 is a perspective view of a pitch measuring device including a photoelectric sensor that emits light in a strip-like shape perpendicular to a moving direction of a moving unit.

The photoelectric sensor 160 may be configured to emit linear light and may be configured to emit strip-like light. When the photoelectric sensor 160 that emits light having a strip-like shape perpendicular to the moving direction X of the moving unit 150 is used, light of which the optical axis extends in a vertical direction is emitted continuously in a strip-like form in the direction Y. FIG. 28 is a perspective view of the pitch measuring device 90 including the photoelectric sensor 160 that emits the strip-like light. A symbol SA in FIG. 28 indicates a detection region of the photoelectric sensor 160. This detection region SA has a width in the direction Y.

Figure 29:
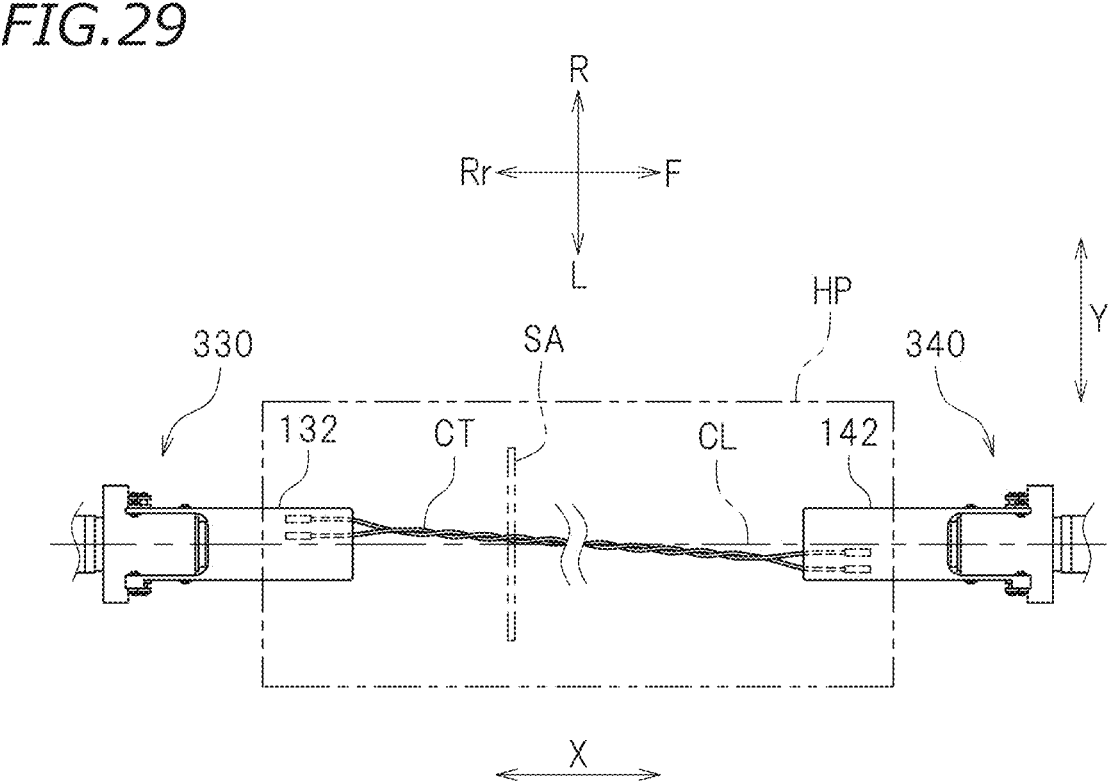
FIG. 29 is a perspective top view of the pitch measuring device illustrated in FIG. 28.

FIG. 29 is a schematic top view of the pitch measuring device 90 illustrated in FIG. 28. As illustrated in FIG. 29, even when the twisted electric wire CT is tilted from the center line of revolution CL when seen from the above, since the detection region SA of the photoelectric sensor 160 has a width in the direction Y, all portions of the twisted electric wire CT falls within the detection region SA. Therefore, even when the first and second gripping devices 330 and 340 are not rotated or the photoelectric sensor 160 is not rotated, it is possible to perform the pitch measurement by the photoelectric sensor 160 satisfactorily. Furthermore, in this example, since the first and second gripping devices 330 and 340 are oriented horizontally, all portions of the twisted electric wire CT fall within the same horizontal plane HP. Due to this, the distances between the projector 162 and the respective portions of the twisted electric wire CT become equal and the distances between the receiver 164 and the respective portions of the twisted electric wire CT become equal. Therefore, it is possible to perform the pitch measurement by the photoelectric sensor 160 more satisfactorily. In this example, since the first and second gripping devices 330 and 340 are oriented horizontally, all portions of the twisted electric wire CT are disposed within the same plane perpendicular to the optical axis of the photoelectric sensor 160. However, if not, the pitch measuring device 90 may include a mechanism for rotating the first and second gripping devices 330 and 340 or rotating the moving unit 150 so that the twisted electric wire CT is disposed within the same plane perpendicular to the optical axis of the photoelectric sensor 160.

Figure 30:
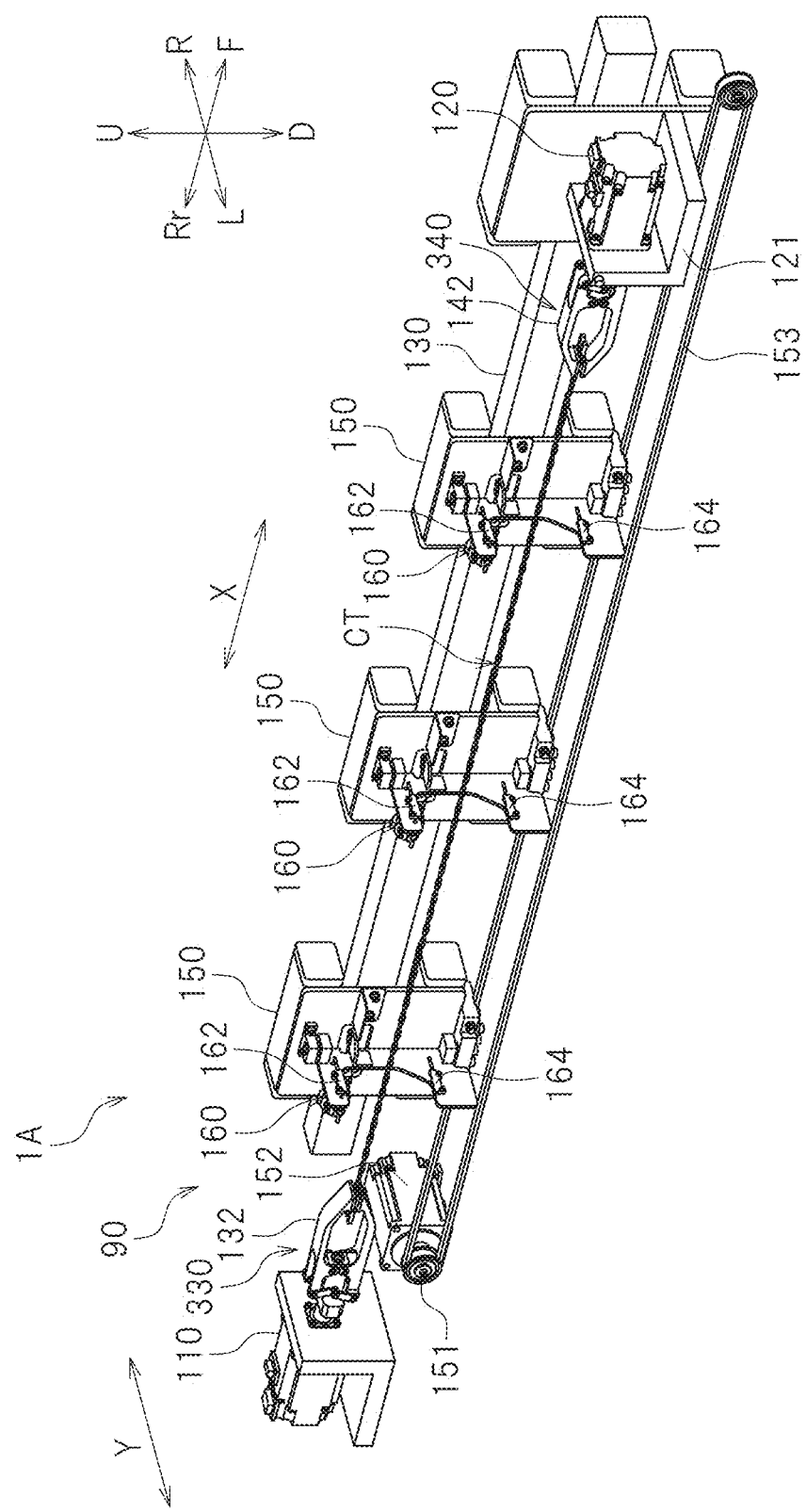
FIG. 30 is a perspective view of a pitch measuring device including a plurality of sets of moving units and pitch measuring sensors.

In the embodiment described above, one pitch sensor 160 is provided between the first and second gripping devices 330 and 340. However, a plurality of pitch sensors 160 may be provided between the first and second gripping devices 330 and 340. For example, as illustrated in FIG. 30, three pitch sensors 160 may be provided between the first and second gripping devices 330 and 340. A number of moving units 150 the same as the number of pitch sensors 160 are engaged with the rail 130. The respective pitch sensors 160 are supported by the moving units 150 engaged with the rail 130.

When a plurality of pitch sensors 160 is provided, a measurement range per one pitch sensor 160 in the longitudinal direction of the twisted electric wire CT can be decreased. Therefore, it is possible to shorten the time for measuring the pitch of the twisted electric wire CT. For example, when three pitch sensors 160 are provided, the pitch measurement time can be shorted by ⅓.

In the embodiment described above, the conveying arm 143 is configured to deliver the first and second electric wires C1 and C2 to the first and second gripping devices 330 and 340 from a lateral side. However, depending on the type of the twisting device 1A, the conveying arm 143 may deliver the first and second electric wires C1 and C2 to the first and second gripping devices 330 and 340 from the upper side toward the lower side. In this case, the pitch sensor 160 may become an obstacle.

As illustrated in FIG. 24, a collection tray 155 may be disposed below the first and second gripping devices 330 and 340 and the pitch sensor 160. In this case, after the pitch of the twisted electric wire CT is measured, the twisting device 1A opens the first and second gripping devices 330 and 340 so that the twisted electric wire CT falls freely to be collected in the collection tray 155. In this case, the pitch sensor 160 may become an obstacle.

Figure 31:
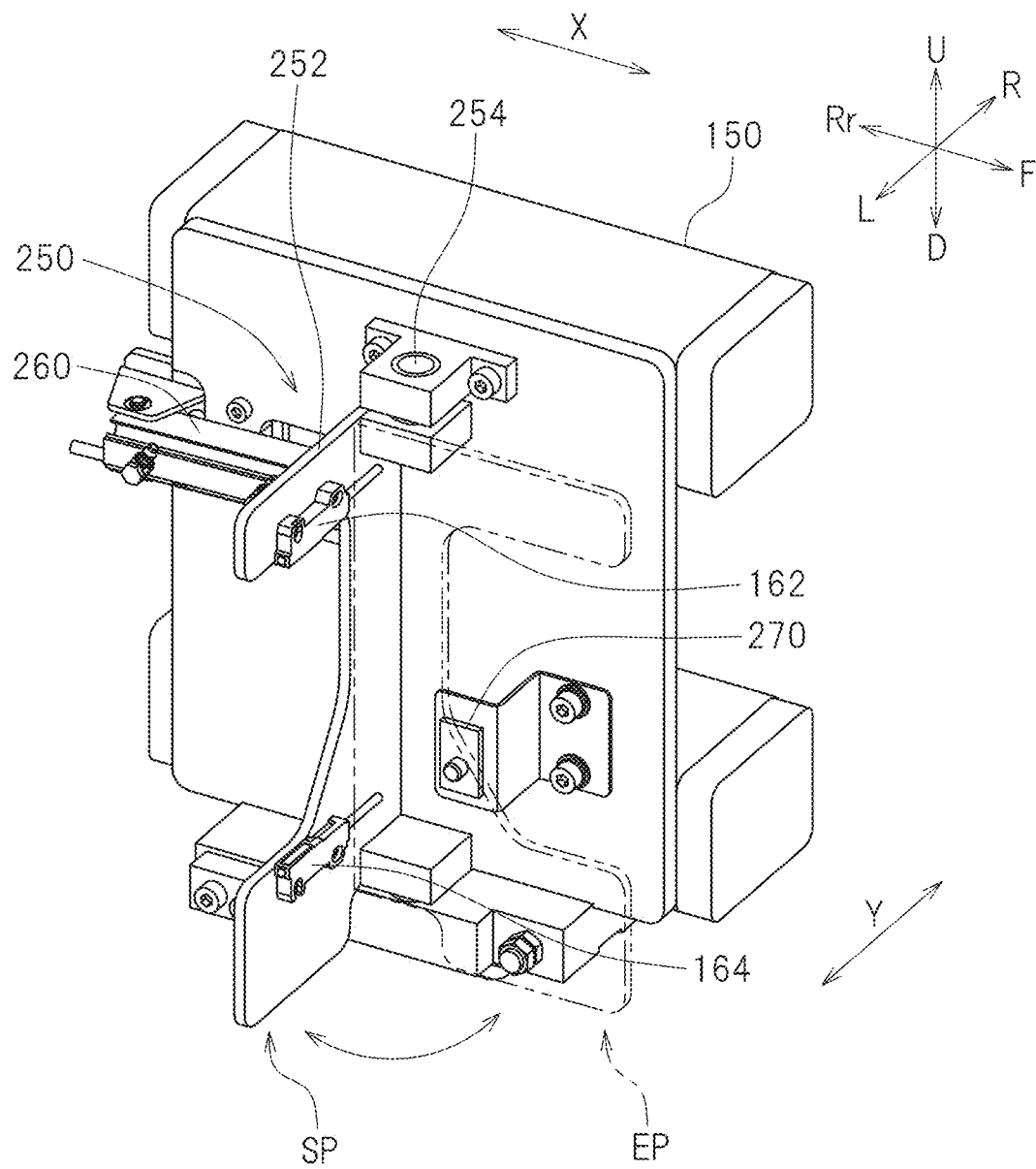
FIG. 31 is a perspective view of a moving unit having a sensor attachment member.

Therefore, as illustrated in FIG. 31, the sensor attachment member 250 to which the pitch sensor 160 is attached may be configured to be movable between a detection position SP and an evacuation position EP. Although the configuration of the sensor attachment member 250 is not particularly limited, the sensor attachment member 250 includes an attachment plate 252 and a hinge 254. The attachment plate 252 is configured to be rotatable about a vertical axis. The projector 162 and the receiver 164 are attached to the attachment plate 252. A position at which the attachment plate 252 faces the direction Y is the detection position SP and a position at which the attachment plate 252 faces the direction X is the evacuation position EP. When the attachment plate 252 is at the detection position SP, the attachment plate 252 overlaps the twisted electric wire CT when seen from the above. When the attachment plate 252 is at the detection position SP, the twisted electric wire CT is positioned between the projector 162 and the receiver 164. On the other hand, when the attachment plate 252 is at the evacuation position EP, the attachment plate 252 does not overlap the twisted electric wire CT when seen from the above. When the attachment plate 252 is at the evacuation position EP, the twisted electric wire CT is not disposed between the projector 162 and the receiver 164.

According to the present embodiment, when the pitch of the twisted electric wire CT is not measured, the sensor attachment member 250 is moved to the evacuation position EP whereby the pitch sensor 160 and the sensor attachment member 250 are prevented from becoming an obstacle. That is, when the first and second electric wires C1 and C2 are delivered to the first and second gripping devices 330 and 340 from the upper side toward the lower side, or when the first and second gripping devices 330 and 340 are open so that the twisted electric wire CT falls freely, it is possible to prevent the pitch sensor 160 and the sensor attachment member 250 from becoming an obstacle. Moreover, it is possible to prevent the first and second electric wires C1 and C2 from making contact with the pitch sensor 160 or the sensor attachment member 250 when the first and second gripping devices 330 and 340 are rotated.

Although the sensor attachment member 250 may be moved manually by a user, an actuator 260 may be provided so as to move the sensor attachment member 250 between the detection position SP and the evacuation position EP. The actuator 260 is an air cylinder, an electric motor, or the like, for example. For example, an air cylinder having a shaft connected to the attachment plate 252 may be used. The actuator 260 may be controlled so as to be interlocked with at least one of the conveying unit 140, the first gripping devices 330 and 340, and the motors 110 and 120.

An evacuation detection sensor that detects whether the sensor attachment member 250 is at the evacuation position EP may be provided. By detecting the position of the sensor attachment member 250, it is possible to prevent the first and second electric wires C1 and C2 from being conveyed to the first and second gripping devices 330 and 340 from the upper side toward the lower side and to prevent the twisted electric wire CT from falling toward the collection tray 155 in a state in which the sensor attachment member 250 is at the detection position SP. Whether the sensor attachment member 250 is at the evacuation position EP can be ascertained by the naked eyes. However, by using the evacuation detection sensor, it is possible to detect that the sensor attachment member 250 is at the evacuation position EP more reliably.

Various control operations can be performed using a signal output by the evacuation detection sensor. For example, when the conveying unit 140 conveys the electric wires C1 and C2 toward the first gripping devices 330 and 340 in a state in which the sensor attachment member 250 is at the detection position SP, the operation of the conveying unit 140 may be forcibly stopped according to the signal output by the evacuation detection sensor. The first and second gripping devices 330 and 340 may be caused so as not to release the twisted electric wire CT when the sensor attachment member 250 is at the detection position SP using the signal output by the evacuation detection sensor.

The configuration of the evacuation detection sensor is not particularly limited. The evacuation detection sensor is a proximity switch included in the actuator 260, for example. For example, by using an air cylinder with a proximity switch, it is possible to detect a position at which the shaft of the air cylinder is retracted and a position at which the air cylinder is extended. Moreover, as illustrated in FIG. 31, a limit switch 270 may be disposed at a position at which the limit switch 270 is pressed by the attachment plate 252 when the sensor attachment member 250 is folded to the evacuation position EP.

Figure 32:
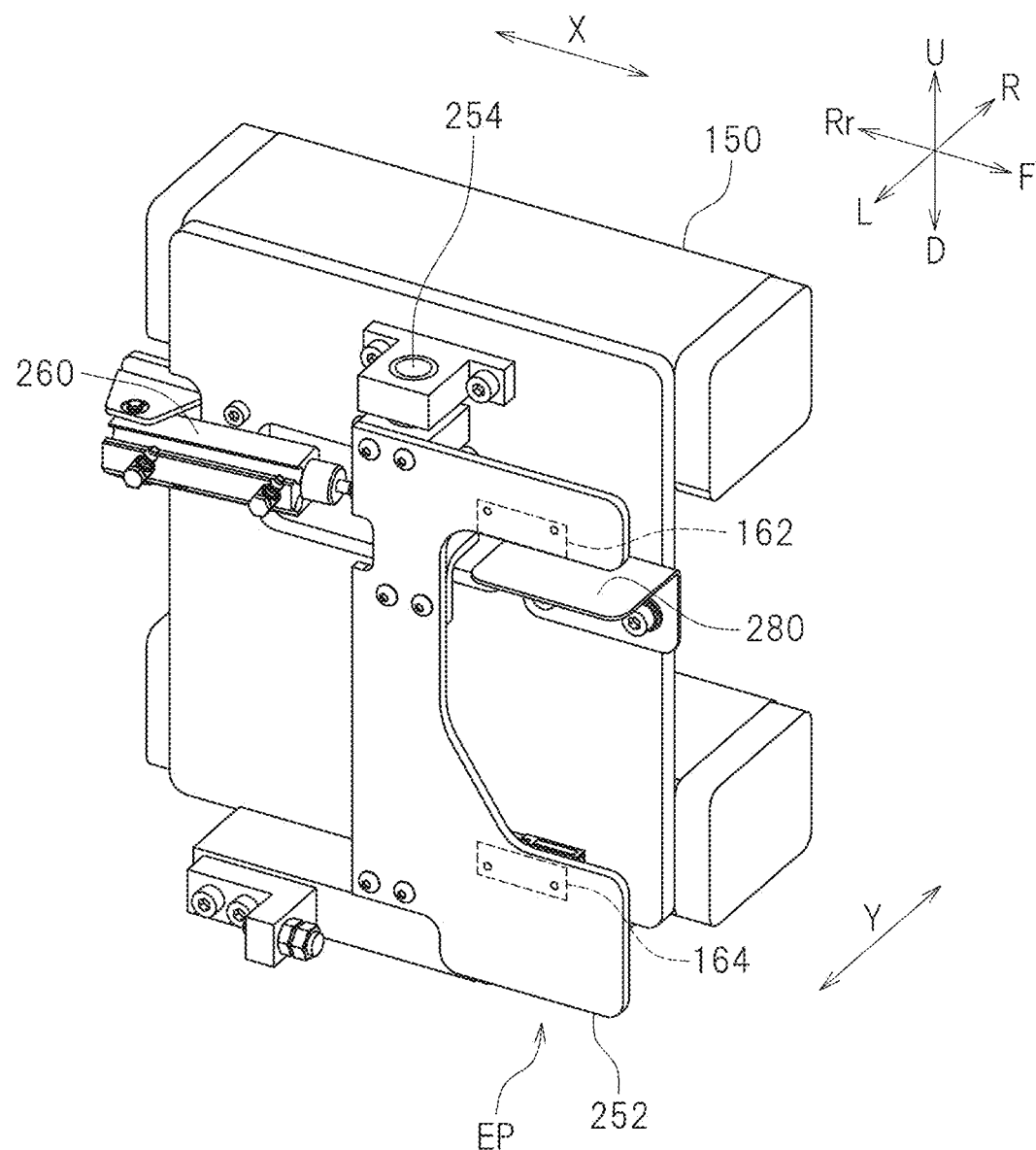
FIG. 32 is a perspective view of a moving unit having a shielding plate.

Although a dedicated sensor may be provided as the evacuation detection sensor, the pitch sensor 160 may be used as the evacuation detection sensor. For example, as illustrated in FIG. 32, a shielding plate 280 may be provided so as to block light traveling from the projector 162 toward the receiver 164 when the sensor attachment member 250 is at the evacuation position EP so that the detection state of the pitch sensor 160 is different depending on whether the sensor attachment member 250 is at the detection position SP or the evacuation position EP. In this way, it is not necessary to provide an evacuation detection sensor apart from the pitch sensor 160. Therefore, it is possible to decrease the number of components of the twisting device 1A.

By using the pitch sensor 160, it is possible to detect whether the first and second electric wires C1 and C2 are disposed between the first and second gripping devices 330 and 340. In other words, by using the signal output from the pitch sensor 160, it is possible to detect whether the first and second electric wires C1 and C2 are held by the first and second gripping devices 330 and 340 before the first and second electric wires C1 and C2 are twisted. Moreover, it is possible to detect whether the twisted electric wire CT is held by the first and second gripping devices 330 and 340 after the first and second electric wires C1 and C2 are twisted.

The twisting device 1A may include a determination device 190 (see FIG. 24) that determines whether the twisted electric wire CT is held by the first and second gripping devices 330 and 340 on the basis of the signal output from the pitch sensor 160 before or after the moving unit 150 is moved. The determination device 190 receives a signal from the pitch sensor 160 and determines whether the twisted electric wire CT is actually held at a position at which the twisted electric wire CT is to be held. For example, this determination is made by determining whether an obstacle is present in a detection region of the photoelectric sensor 160. When the twisted electric wire CT is not present between the first and second gripping devices 330 and 340, light from the projector 162 is not blocked at any position of the detection region but light is received at all positions. When the determination device 190 determines that the twisted electric wire CT is not held, a process of stopping the twisting device 1A, a process of issuing a warning, or the like may be performed.

In the twisting device 1A, the first gripping device 330 is configured to grip one set of ends of the first and second electric wires C1 and C2, and the second gripping device 340 is configured to grip the other set of ends of the first and second electric wires C1 and C2. The conveying unit 140 is configured to deliver one set of ends of the first electric wires C1 and C2 to the first gripping device 330 simultaneously and deliver the other set of ends of the first and second electric wires C1 and C2 to the second gripping device 340 simultaneously. However, the first gripping device 330 may be configured to grip one end of the first electric wire C1 and one end of the second electric wire C2 individually. The second gripping device 340 may be configured to grip the other end of the first electric wire C1 and the other end of the second electric wire C2 individually. The conveying unit 140 may be configured to convey the first and second electric wires C1 and C2 individually.

The pitch measurement may be performed for all twisted electric wires CT produced by the twisting device 1A and may be performed for only some of the twisted electric wires CT produced successively. For example, the pitch measurement may be performed for a predetermined number of twisted electric wires CT immediately after startup of the twisting device 1A (initial inspection). Alternatively, the pitch measurement may be performed for a predetermined number of twisted electric wires CT at every predetermined intervals during operation of the twisting device 1A (periodic inspection). The pitch measurement may be performed when a user has instructed to do so. The pitch measurement can be executed at an arbitrary timing.

Hereinabove, the pitch measuring device 90 provided in the twisting device 1A has been described. As described above, the twisting device 1 according to the third embodiment is configured such that the pitch measuring device 90 is added to the twisting device 1 according to the first or second embodiment. For example, it is possible to obtain the twisting device 1 including the pitch measuring device 90 by replacing the first and second gripping devices 330 and 340, the motors 110 and 120, the rail 130, and the slider 121 of the twisting device 1A with the first and second gripping devices 11 and 12, the first and second motors 3a and 3b, the rail 4, and the base 5 of the first gripping unit 51 of the twisting device 1, respectively.

REFERENCE SIGNS LIST

1 Electric wire twisting device
2a First clamp
2b Second clamp
3a First motor (First rotating actuator)
3b Second motor (First revolving actuator)
15A First holder
11 First gripping device
12 Second gripping device
C1 First electric wire
C2 Second electric wire
CT Twisted electric wire
CL Center line of revolution
Q1 First center line of rotation
Q2 Second center line of rotation

The invention claimed is:

1. An electric wire twisting device producing a twisted electric wire by twisting at least a first electric wire and a second electric wire each of the first and second electric wires having a first end and a second end, the electric wire twisting device comprising:
a first gripping device including a first clamp that grips the first end of the first electric wire and a second clamp that grips the first end of the second electric wire;
a second gripping device that grips the second end of the first electric wire and the second end of the second electric wire;
a revolving actuator that causes the first gripping device to rotate in a first rotation direction around a center line of revolution or causes the second gripping device to rotate in a second rotation direction around the center line of revolution;
a rotating actuator that causes the first clamp to rotate in the second rotation direction around a first center line of rotation that is parallel to the center line of revolution or is inclined with respect to the center line of revolution and/or causes the second clamp to rotate in the second rotation direction around a second center line of rotation that is parallel to the center line of revolution or is inclined with respect to the center line of revolution; and
a controller programmed to start driving the rotating actuator and driving the revolving actuator, wherein
the controller is programmed to start driving the revolving actuator after the rotating actuator starts driving.

2. The electric wire twisting device according to claim 1, further comprising:
a pitch measuring device that measures a pitch of twisting of the twisted electric wire, wherein
the pitch measuring device includes:
a moving unit that is disposed between the first gripping device and the second gripping device and is movable along the center line of revolution;
a sensor that is supported on the moving unit so as to detect a surface position of the twisted electric wire; and
a processor that calculates the pitch of twisting of the twisted electric wire on the basis of the surface position of the twisted electric wire detected by the sensor.

3. The electric wire twisting device according to claim 2, wherein
the sensor is an optical sensor, and
the first gripping device, the second gripping device, and the moving unit are configured so that the twisted electric wire is disposed within a plane including the center line of revolution and an optical axis of the optical sensor or a plane parallel to the plane when the optical sensor performs detection.

4. The electric wire twisting device according to claim 2, further comprising:
a rail that extends in a direction parallel to the center line of revolution and configured such that at least one of the first gripping device and the second gripping device is slidably engaged with the rail, wherein
the moving unit is slidably engaged with the rail.

5. The electric wire twisting device according to claim 2, wherein
the moving unit has a sensor attachment member to which the sensor is attached, and
the sensor attachment member includes an attachment plate that is movable between a detection position at which the sensor detects the surface position of the twisted electric wire and an evacuation position at which the sensor attachment member is evacuated from the detection position.

6. An electric wire twisting device producing a twisted electric wire by twisting at least a first electric wire and a second electric wire each of the first and second electric wires having a first end and a second end, the electric wire twisting device comprising:
a first gripping device including a first clamp that grips the first end of the first electric wire and a second clamp that grips the first end of the second electric wire;
a second gripping device that grips the second end of the first electric wire and the second end of the second electric wire;
a revolving actuator that causes the first gripping device to rotate in a first rotation direction around a center line of revolution or causes the second gripping device to rotate in a second rotation direction around the center line of revolution;
a rotating actuator that causes the first clamp to rotate in the second rotation direction around a first center line of rotation that is parallel to the center line of revolution or is inclined with respect to the center line of revolution and/or causes the second clamp to rotate in the second rotation direction around a second center line of rotation that is parallel to the center line of revolution or is inclined with respect to the center line of revolution; and
a controller programmed to start driving the rotating actuator and driving the revolving actuator, wherein
the controller is programmed to start driving the rotating actuator after the revolving actuator starts driving.

7. The electric wire twisting device according to claim 6, wherein
the first gripping device includes a first holder that holds the first clamp and the second clamp;
the revolving actuator is a first revolving actuator that is connected to the first holder so as to cause the first holder to rotate; and
the rotating actuator is a first rotating actuator that is connected to at least the first clamp so as to cause the first clamp to rotate.

8. The electric wire twisting device according to claim 7, further comprising:
a driving gear that rotates by a driving force of the first rotating actuator; and
a first gear that is fixed to the first clamp and engages with the driving gear.

9. The electric wire twisting device according to claim 7, wherein
the electric wire twisting device further includes a second revolving actuator;
the second gripping device includes a third clamp that grips the second end of the first electric wire, a fourth clamp that grips the second end of the second electric wire, and a second holder that holds the third clamp and the fourth clamp, and
the second revolving actuator is connected to the second holder so as to cause the second holder to rotate in the second rotation direction.

10. The electric wire twisting device according to claim 9, further comprising:
a second rotating actuator that is connected to at least the third clamp so as to cause the third clamp to rotate around a third center line of rotation that is parallel to the center line of revolution or is inclined with respect to the center line of revolution, wherein the second rotating actuator is configured to cause the third clamp to rotate in the first rotation direction.

11. The electric wire twisting device according to claim 7, wherein
the first clamp is disposed such that a portion of the first clamp comes close to the center line of revolution as the portion of the first clamp comes close to a distal end of the first clamp, and the first center line of rotation is inclined with respect to the center line of revolution; and/or
the second clamp is disposed such that a portion of the second clamp comes close to the center line of revolution as the portion of the second clamp comes close to a distal end of the second clamp, and the second center line of rotation is inclined with respect to the center line of revolution.

12. The electric wire twisting device according to claim 7, wherein
at least one of the first and second clamps includes:
a shaft which has a distal end and a base end and is slidably and rotatably supported by the first holder;
a grip arm which is connected to the distal end of the shaft so that the grip arm is open when the shaft slides from the base end toward the distal end and is closed when the shaft slides from the distal end toward the base end;
a forcing member that is attached to the shaft so as to provide force with the shaft so that the shaft is urged in a first direction from the distal end toward the base end; and
a clamp actuator that provides force with the shaft so that the shaft is urged in a second direction from the base end to the distal end.

13. The electric wire twisting device according to claim 12, wherein
the forcing member is a spring,
the clamp actuator has an engagement portion that is movable between an engagement position, at which the engagement portion engages with the shaft, and a separation position, at which the engagement portion is separated from the shaft, and a driving source that moves the engagement portion, and
the engagement portion engages with the shaft such that force is provided with the shaft so that the shaft is urged from the base end toward the distal end.

14. The electric wire twisting device according to claim 7, wherein
the controller is programmed to start driving the first rotating actuator after the first revolving actuator starts driving.

15. The electric wire twisting device according to claim 7, wherein
the second gripping device includes a third clamp that grips the second end of the first electric wire, a fourth clamp that grips the second end of the second electric wire, and a second holder that holds the third clamp and the fourth clamp,
the revolving actuator includes a second revolving actuator that is connected to the second holder so as to cause the second holder to rotate in the second rotation direction; and
the controller is programmed to start driving the first rotating actuator after the second revolving actuator starts driving.

16. An electric wire twisting device producing a twisted electric wire by twisting at least a first electric wire and a second electric wire each of the first and second electric wires having a first end and a second end, the electric wire twisting device comprising:
- a first gripping device including a first clamp that grips the first end of the first electric wire and a second clamp that grips the first end of the second electric wire;
- a second gripping device that grips the second end of the first electric wire and the second end of the second electric wire;
- a revolving actuator that causes the first gripping device to rotate in a first rotation direction around a center line of revolution or causes the second gripping device to rotate in a second rotation direction around the center line of revolution;
- a rotating actuator that causes the first clamp to rotate in the second rotation direction around a first center line of rotation that is parallel to the center line of revolution or is inclined with respect to the center line of revolution and/or causes the second clamp to rotate in the second rotation direction around a second center line of rotation that is parallel to the center line of revolution or is inclined with respect to the center line of revolution; and
- a controller programmed to start driving the rotating actuator and driving the revolving actuator, wherein the controller is programmed to stop driving the rotating actuator, to then start driving the revolving actuator, and then subsequently resume driving of the rotating actuator after the revolving actuator starts driving.

\* \* \* \* \*